FIG. I

ROBERT B. LONG  Inventor

By Frank A. Dimock
Patent Attorney

ROBERT B. LONG  Inventor

United States Patent Office 3,437,713
Patented Apr. 8, 1969

3,437,713
PROCESS FOR SEPARATING OLEFINS FROM ADMIXTURES WITH HIGH POROSITY CUPROUS HALIDE SALTS
Robert B. Long, Atlantic Highlands, N.J., assignor to Esso Research and Engineering Company, a corporation of Delaware
Continuation-in-part of application Ser. No. 601,208, Dec. 22, 1966, which is a continuation of application Ser. No. 333,926, Dec. 27, 1963, which is a continuation-in-part of application Ser. No. 163,075, Dec. 29, 1961. This application Sept. 21, 1967, Ser. No. 683,045
Int. Cl. C07c 7/16; C01g 3/04
U.S. Cl. 260—681.5      33 Claims

ABSTRACT OF THE DISCLOSURE

Improved novel processes for the separation of a compound capable of forming a complex with a cuprous halide from a mixture containing it are (a) separations other than diolefin from monoolefin separations effected in the absence of the presence of water or alcohols utilizing solid unsupported porous unitary particles of cuprous chloride or cuprous bromide having a porosity of above 10% (of the total volume of a particle) 550–10,000 A. pores and (b) vapor phase separations generally including diolefin from monoolefin separations using said unsupported high porosity cuprous chloride or bromide particles. Also, preferred methods of preparing said high porosity particles are described.

CROSS REFERENCE

Figure 1:

This application is a continuation-in-part of U.S. patent application Ser. No. 601,208 filed Dec. 22, 1966, which is a continuation of U.S. patent application Ser. No. 333,-926 filed Dec. 27, 1963 which is a continuation-in-part of U.S. patent application Ser. No. 163,075, filed Dec. 29, 1961, all now abandoned.

FIELD OF INVENTION

This invention relates to processes for separating compounds wherein a mixture of compounds is contacted with solid particles of cuprous halide, at least one of the compounds reacts to form a cuprous halide complex, and the complex is then separated from the uncomplexed compounds and dissociated by heating to recover the complexed compound in high purity.

PRIOR ART

The field of effecting separations and recovery of unsaturates, e.g. butadiene, ethylene, etc. with solid cuprous chloride or bromide has been exhaustively explored particularly over the past 30 years. During this period in addition to numerous publications some 60 patents have issued to seven major companies describing fixed bed, moving bed, fluidized bed, and slurry processes used with both supported (to increase surface area) and unsupported cuprous halide particles and with both liquid and gaseous feeds. For such processes to be commercially successful it is necessary that the cuprous halide reagent be (a) sufficiently active for substantially all the complexing material to react in a short feed residence time (to minimize valuable material left in the treated feed and size of reactors respectively) and (b) sufficiently accessible for a high percentage of the theoretical capacity (27 wt. percent on CuCl for butadiene) to be reacted (to minimize adsorbent circulation between adsorption and desorption and attendant cooling and heating loads).

With respect to achieving both high activity and capacity with unsupported cuprous halide complexing agents, the patents e.g. U.S. 2,973,396 describe only the importance of the fineness of the state of subdivision of the particles and the purity of the cuprous halide both of which, although providing improvement, are orders of magnitude improved by the preparation of the present invention.

A series of patents does disclose methods of improving the activity of complexing agents of the cuprous halide impregnated on a non-adsorbent carrier type but they do not suggest that any of these are useful to improve the activity of unsupported cuprous halide complexing agents. Thus, U.S. 2,386,354 disclose multiple impregnation to obtain high surface area exposure due to ultra thin layers of cuprous halide in the pores and on the surface of the supports, U.S. 2,401,114 discloses cuprous chloride powder uniformly distributed on shredded asbestos fiber in a relatively loose but cohesive mass and U.S. 2,756,267 states that the above preparations sometimes produce high activity reagents and sometimes do not for unknown reasons and that improvement is obtained by dissolving cuprous halide in an inert (preferably a monoolefin) solvent, adding a diolefin to precipitate the diolefin cuprous halide addition compound which is separated and dryed and then mixing with sawdust preferably containing an outside film of oil, and heating to decompose the complex and thus prepare the improved complexing agent.

Another group of patents discloses certain liquid phase diolefin separation processes which inherently produce at some stage in the process high porosity adsorbent. However, this was unappreciated by the patentees and there was no suggestion of removing the particles and using them externally in a different process. Typical of these diolefin recovery patents are (a) aqueous precipitation and slurry U.S. 2,386,333, U.S. 1,988,479, (b) hydrocarbon precipitation and slurry U.S. 2,386,356, U.S. 2,395,-955, U.S. 2,359,020.

SUMMARY

The present invention is the discovery that solid unsupported particles of cuprous chloride or cuprous bromide can be prepared having a highly porous interconnecting large pore structure (e.g. 35% of the total volume of the particle 550–10,000 A. pores) allowing ready access of the feed to particle surface. Also, that these particles used in novel separation processes provide the high activity and capacity needed for commercial processes. It is noted that in addition to the discovery that prior art contacting of solid cuprous halide with liquid phase crude diolefin produces activation that it has now been discovered that the following do not produce the present activation: (a) liquid phase contacting with diolefins and other ligands complexing in above 1:1 stoichiometry in the absence of monoolefin, alcohol or water activators, (b) liquid phase contacting with 1:1 ligands with or without activators and (c) vapor phase contacting generally i.e. with any ligand with or without activators. The present invention also embraces discovery of various preparation procedures particularly adapted to produce superior particles for fluidized bed use.

THE DRAWINGS

Figure 3:
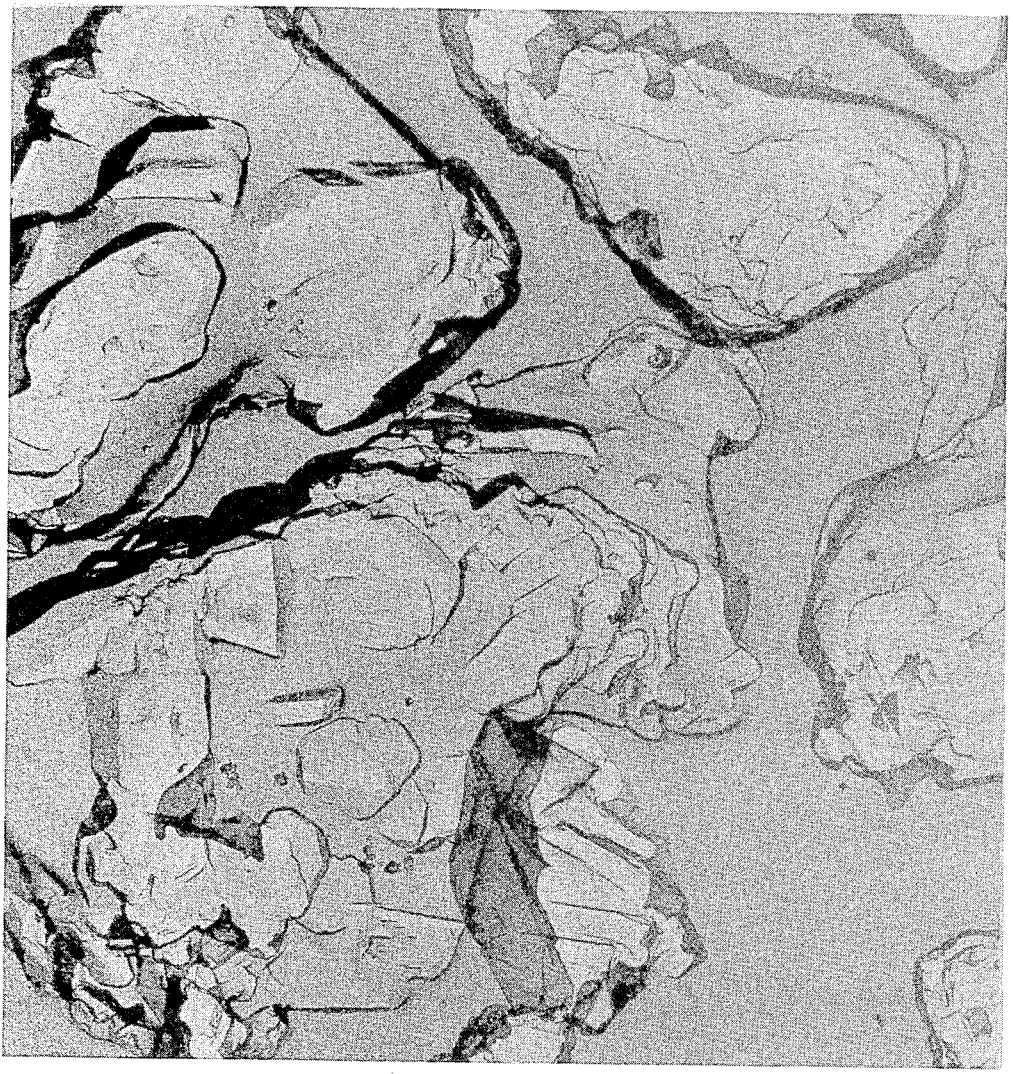
Figure 4:
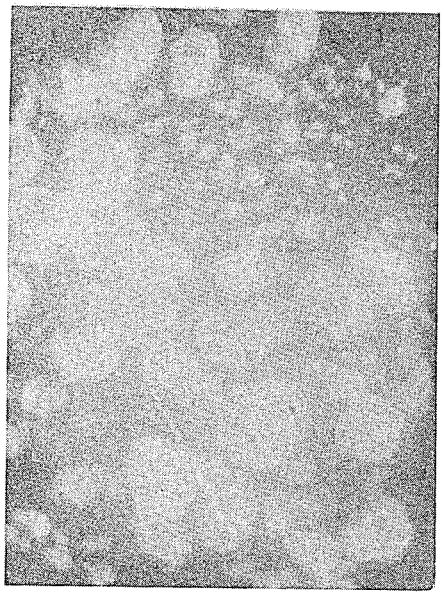
Figure 5:
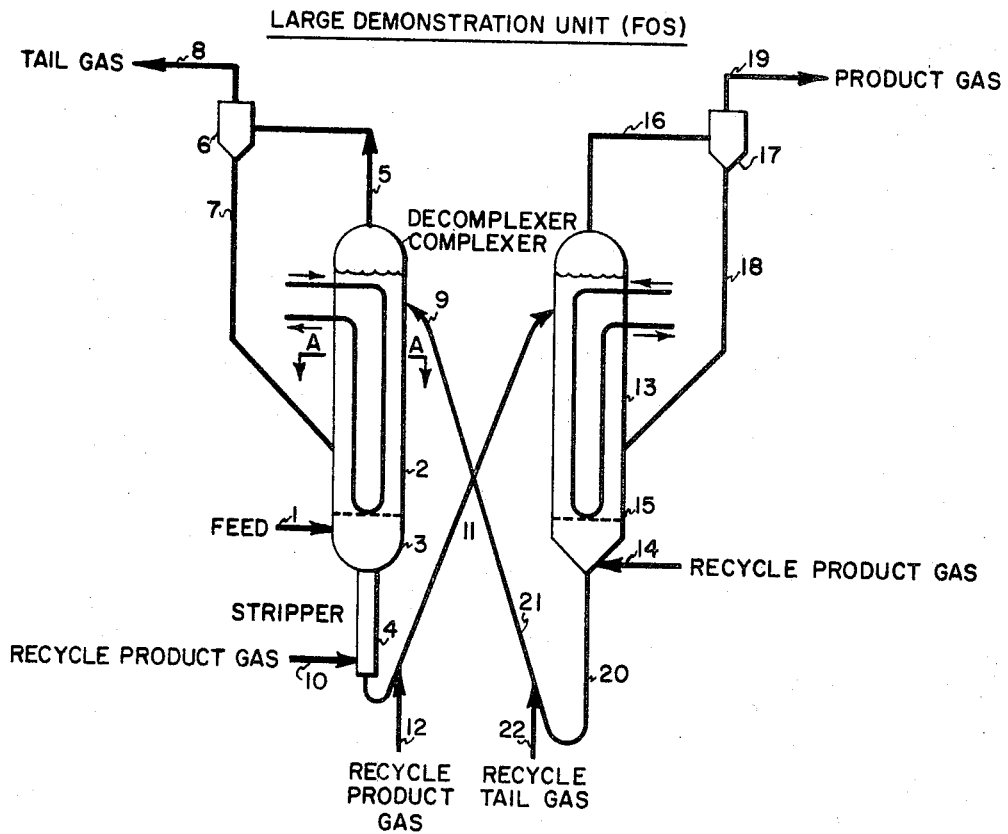
Figure 5A:
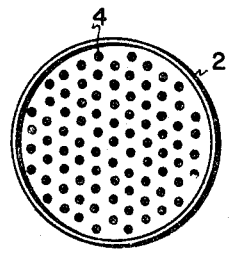

The drawings, FIGURES 1–4, present photomicrograph views of the active high porosity cuprous halide particles as compared to conventional purchased cuprous halide particles and FIGURES 5 and 5A present a flow plan for carrying out a vapor phase separation process in which the cuprous halide particles are suspended as fluid beds by the upflowing vapors.

Figure 2:

The structure of the present new cuprous chloride and bromide particles is seen from the accompanying drawings which are reproductions of photomicrographs of typical actual samples. Referring to FIGURES 1 and 2 electron microscope pictures (magnification 10,000×) are presented of replicas (prepared by dusting particles on a polystyrene wafer, lightly pressing the wafer between two slides for 5 minutes at 330° F., cooling gradually, dissolving the copper salt out with HCl, coating the impression side with germanium metal, coating with carbon vapor and finally dissolving away the polystyrene to leave a several hundred angstrom thin, carbon replica shadowed with germanium) of preferred particles of CuCl (FIG. 1) and CuBr (FIG. 2) prepared by complexing CuCl or CuBr dissolved in HCl or HBr respectively with butadiene, precipitating (growing) the particles in water and dissociating. As can be seen the particles have a well defined highly porous structure, the particular particles shown being about 10–15 microns in average diameter (smaller than optimum size particles shown so that shape and edges can be seen). Additionally, as can be seen the individual pores shown are e.g. about 1600 A.–3200 A. in width. A discussion of the presence of very small pores which are also preferably present and are seen by porosimeter measurements only, follows. It is of interest to compare this material with commercially available C.P. cuprous chloride. Referring to FIGURE 3, an electron microscope picture of a replica (prepared as previously described) of particles of such commercial cuprous chloride is presented for comparison. As can be seen these much more dense particles have an almost completely smooth surface. It has been found this is true also of 100% purity cuprous chloride prepared by recrystallizing CuCl from concentrated HCl, etc.

From the above described electron microscope pictures of the surface of the present new cuprous chloride and bromide particles and from the mercury porosimeter and $CCl_4$ porosimeter data on pore volume now presented showing that approximately 20–50% of the total volume is large size pores the extraordinary activity and capacity of these particles can be understood (it is noted that porosimeter measurements are presented in terms of the equivalent diameter of round pores i.e. tunnels and will be higher than the widths shown on the photographs):

of the present particles. It is also noted that mercury porosimeter tests on 20–40 $\mu$ glass beads indicate 0.002 cc./gm. of the desired 550/10,000 A. pore volume (i.e. essentially none). This indicates that the 550/10,000 A. pore volume results for the new CuCl and CuBr particles are real and not measurements of spaces between particles. The unique porous structure of the present new complexing agents permits entry of the complexing gases which swell the membrane (i.e. the walls of the interconnecting honeycomb pores) to approximately twice their original thickness as complexing proceeds but without closing these pores due to their large diameter at least until complexing proceeds to near theoretical capacity. It is noted that surface area measurements on the complexed particles indicate approximately zero surface area. It should be noted that the present complexing absorption is a chemical combination with the membranes and not a capillarity effect filling the large pores as present in e.g. a sponge. Similarly on decomplexing (which does not decrease, i.e. shrink the size of the particles) the unique open (interconnecting) porous structure of the particles permits rapid release of the gases without destroying the said porous structure. The said open porous structure offers an additional advantage in preparation of high purity product in that a small amount of decomplexing prior to the main desorption has been found to be extremely effective to obtain sweeping out of the non-selectively adsorbed contaminants, e.g. acetylenes, absorbed on the surfaces of the pores mainly by the gases evolved from the complex. This produces two advantages: (1) minimization of the amount of stripping gas required and (2) more important, since product gas from the desorber has been found to be the preferred gas to be used for stripping, minimization of contamination by the same residual nonselectively adsorbed impurities present therein. It should be noted that this open access to the membranes of the highly porous large pore, large size, pure (unsupported) particles having the necessary strength to permit the required circulation around cooling surfaces (e.g. in a fluidized bed), is indeed a major step

|  | Pore Volume, cc./gm. | | | |
|---|---|---|---|---|
|  | $CCl_4$ Porosimeter, | Hg Porosimeter | | |
|  |  | 70–550 A. | 550–10,000 A.[1] | >10,000 A. |
| CuCl of Fig. 1 | <800 A. Nil | 0.007 | 0.197 | 0.044 |
| CuBr of Fig. 2 | [2] 0.04 | 0.009 | 0.117 | 0.083 |
| CuCl recrystallized from HCl (similar to Fig. 3)—after use in Fluid Bed i.e. to develop maximum pores | <0.01 | 0.006 | 0.009 | 0.187 |

[1] Typical good CuCl (CuBr proportions the same) 550–10,000 A. distribution: 550–700 A.= 0.000, 700–1,400 A.=0.002, 1,400–2,100 A.=0.002, 2,100–4,300 A.=0.070, 4,300–10,000 A. =0.123.
[2] This volume is in the 550–800 A. range.

The above data show that the present new cuprous chloride and bromide particles are unique in having enormous open porosity in the 550–10,000 A. pore diameter range. It is noted that open (i.e. interconnecting pores) porosity only, is measured by porosimeter). Thus, converting the (cc./gm.) pore volume figures to (cc./cc.) figures by dividing by density of the solid to get solid volume and adding pore volume and solid volume to get total volume of 1 gram of particles and finally calculating the fraction of such total volume as pores gives respectively for CuCl and CuBr 41.1% and 29.3% of the total volume as 550–10,000 A. pores. It should also be noted that relatively small amounts of pores below 550 A. are present (which as will be described is important to the activity of the particle both due to partial condensation effects and due to providing additional access between pores), and that the figures for pores of above 10,000 A. (1$\mu$) are presented merely for completeness and are probably mainly measurements of spaces between particles and thus essentially meaningless with respect to the pore volume forward over prior art suggestions to allow such access by coating supports, e.g. distributing extremely fine powder on the surface, impregnating to obtain a monomolecular layer, etc. Use of supports of course reduces selectivity due to nonselective absorption on the support itself. It is noted that the surprising strength and retention of activity and capacity of the present new particles in vapor phase fluidized solids (fluid dense bed) use is witnessed by laboratory data showing that at least 15 cycles (complexing-decomplexing) use of active CuCl on commercial piperylenes concentrate (10/30$\mu$ particles precipitated from an acid solution of the complex) did not appreciably reduce activity and capacity or particle size. Additionally, laboratory fixed bed tests showed maintenance of activity and capacity for at least 2,000 cycles on technical grade ethylene and at least 225 cycles on C.P. butadiene. Although the above description of the mechanism producing the present superior process is believed to be correct, it is of course, not intended to limit this invention thereby, the particular new cuprous chloride and bromide particles and critical processes for their use being the invention taught.

The present new cuprous chloride and bromide complexing agents have the following physical characteristics:

(1) Size—above about 50%, preferably above about 65%, more preferably above about 80% by weight of particles 1–1600µ, preferably 10–600µ, more preferably 20–300µ, yet more preferably 300–200µ, most preferably 50–150µ (average diameters). In all embodiments the particles are regular unitary (rigid continuously joined structures, not small particles physically aggregated by surface effects only) particles slowly grown from solution as complexed single particles or complexed macroparticles composed of continuously joined microparticles, i.e. dendritically grown, which retain after dissociation within the porous structure the single particle or macroparticle composed of continuously joined microparticles structure (rather than agglomerates of small particles rapidly nucleated from solution and then physically combined by surface attractions only i.e. typical agglomerates have considerably less strength than the present invention particles). Examples of especially preferred particles are: (1) particles above 50%, preferable above 80% 10–50µ single particles or macroparticles composed of up to four continuously joined above 5–30µ length microparticles and (2) particles above 50%, preferably above 80% 50–400µ; preferably 75–300µ, more preferably 75–150µ spherical macroparticles composed of more than four continuously joined microparticles, the said microparticle being of about 5–30µ (length) in size. It is noted that X-ray measurements show a very small 400–1300 A., usually 600–1100 A. basic crystals size within the single particle or macroparticle composed of continuously joined microparticles. This basic crystal size was found to be in general identical regardless of the preparation technique. It is believed that the wall of the membranes separating the pores are thus probably only several basic crystals thick, i.e. from the e.g. 2000 A. wall thicknesses shown on the electron micrographs. It is remarkable that open porosity sponge-like particles are so crystalline and have such unusual strength in e.g. fluid bed use. The large spherical macroparticles are particularly desirable since the smooth spherical structure has been found to provide excellent attrition resistance e.g. in fluid bed use and in addition it has been found that the present large 100–300µ spheres provide excellent smooth fluidization over a wide range of gas rates along with high activity and capacity. It should be noted that despite the fact that these smooth spheres are macroparticles of continuously joined microparticles (filleted to provide a smooth sphere surface rather than the sharp corners of the single crystals), the open porosity for complexing throughout the crystal persists (shown by porosimeter). A microscopic picture (magnification 60×) of the preferred 100–300µ spheres prepared in Example 2 is shown in FIGURE 4. The individual microparticles making up the spherical macroparticles can be seen in the picture. The filleting growth between microparticles obtained in the growth of the smooth spheres can also be seen. A further proof of the (continuously joined) unitary rigid structure of the present porous particles both small single particles and macroparticles, and large spherical macroparticles is shown by the fact that the complexed particles have enormous strength, e.g. it has been found that complexed particles cannot be broken between two microscope slides by strong hand pressure. Typical normal aggregates even though complexed would be broken by such hand pressure.

(2) Porosity—above 10%, more preferably above 15%, yet more preferably above 25%, most preferably above 35% of total volume of the particle pores of 550/10,000 A. diameter, preponderantly above 2000 A. diameter. Also, preferably particles have 0.1–15%, preferably 0.3–5%, most preferably 0.5–3% of total volume of pores of 1–550 A., preferably 70–550 A. (small pores permit condensation but amount is small enough so as not to limit activity on complexing or strippability (for product purity) due to diffusion limitations). It should be noted that the present large pore porosity is unusual in that conventional porous solids such as cracking catalyst, catalyst supports, adsorbents including molecular sieves, all have the bulk of their pore volume smaller than 100 A.

(3) Purity—preferably above 90% CuCl or CuBr, more preferably above 95%, yet more preferably above 97.5%, most preferably above 98.5% (the higher purities are desirably not only to obtain high activity and capacity in use, i.e., maintenance of high large pore porosity but also to increase mechanical strength and to prevent polymerization and polymer laydown on the particles in sustained multicycle use).

(4) Surface area—preferably above 2 m.$^2$/gm., e.g. 3–20 m.$^2$/gm. It is noted that the higher surface areas within the above range are not per se preferred because of stripping problems associated with higher surface areas. In preferred embodiments the gross morphology of the particles has been found to be either short, rectangular or hexagonal cross-section needles (preferred for the single macroparticle embodiment), spheres (preferred for the dendritic macroparticle ebodiment), pyramids, or cubes depending on the method of preparation. These particles have approximately equal height, width and length.

The new cuprous chloride or bromide particles of this invention are prepared by the steps of slow precipitation (growth) of crystalline cuprous chloride or bromide diolefin, acetylene, nitrile, or carbon monoxide complex particles from a liquid containing the complex in solution whereby solid cuprous chloride or bromide complex particles above 1µ, preferably above 10µ average are formed and dissociating said precipitated solid complex to obtain after dissociation the highly active porous cuprous salt. In general any method may be used so long as uniform solid complexed particles slowly precipitate (i.e. are formed or grow) from solution in a size above about 1µ, preferably above 10µ. Thus, it has now been found (as will be demonstrated in Example 21) that slow rates of macroparticle growth are required to produce the desired large (above 10µ, and other preferred size ranges recited above) strong porous particles but that the permissible growth rate depends both the ligand used to make the complex and on the solvent from which the complex is grown. Average rates of crystal growth over the period of precipitation, i.e. grams/hour/liter are determined as follows: grams of complex recovered is divided by the time (hours) over which precipitation occurred and the resulting figure is divided by the total liters of original cuprous salt solution (a fuller discussion of this rate is contained in Example 21). The following slow rates are highly preferred for growth of good above 10µ complex particles from solution, especially inorganic acid-water solutions: <1000 gms./hour/liter, preferably <500 gms./hour/liter, more preferably 5–300 gms./hour/liter, most preferably (fcr butadiene complex particularly) 25–100 gms./hour/liter. It is noted that rates less than 5 gms./liter/hour may be used but that the particles tend to be too large and of course such long reaction times unnecessarily increase the cost of preparation. While these rates are averages over a steady rate addition period, they are critical at the beginning of the period to prevent excessive nucleation. Higher rates may be used after the first 10% of precipitation has occurred. For more soluble (than butadiene) complexes (Example 21) of other complexing materials precipitation rates can be increased 3-fold. The preparation of preferred large above 50µ, preferably 50–150µ spherical macroparticles composed of continuously joined microparticles is obtained by using particularly slow precipitation rates especially at the beginning of precipitation to prevent excessive nucleation. For butadiene as the complexing material it is particularly preferred to add the antisolvent e.g. water to the solvent e.g. concentrated HCl to obtain a slow decrease in solubility and to use precipitation rates of less than 100 gms./hour/liter. With complexing materials which produce more soluble complexes higher rates may be used, still preferably below 1000 gms./hour/liter, but it is still preferred to decrease solubility slowly.

The above slow rates are obtained by the following general expedients which by creating a condition of low supersaturation for a considerable length of time during the precipitation either favors growth of initially formed particles or suppresses nucleation of new particles or both: (1) controlled slow rate of addition (mixing) of the particular reagent(s) which cause the cuprous chloride or bromide complex to precipitate out, or (2) controlled slow change in conditions to create low supersaturation. Specific expedients falling within (1) and (2) above which may be used alone or in combination are: (a) slow decrease in solubility by slow addition of antisolvent to the solution of the complex (rather than addition of solution to the antisolvent), (b) slow addition of the complexing material to solution of CuCl or CuBr (preferably low concentration) in a solvent in which the complex is less soluble than the CuCl or CuBr, (c) slow change in temperature to decrease solubility, (d) slow evaporation of solvent, (e) a controlled slow change in conditions during the latter part of the total precipitation period to create low supersaturation, e.g. slow addition of the solution of the complex to a limited amount of the antisolvent, although initial precipitation is rapid, as the amount of solvent builds up in the antisolvent low supersaturation occurs and the particles grow (well known percolation growth). All of these methods suppress nucleation of new particles and favor growth on nuclei already present.

It should be noted that care should be taken to prevent decomposition of the complex during precipitation by utilizing the well known temperatures and pressure within which the complex is stable, e.g. either low temperatures or high partial pressures of the complexing material or both may be maintained during precipitation.

Examples of general methods of preparation which by using the techniques recited above produce the large complex particles from which the desired new porous chloride or bromide is obtained upon dissociation are:

(1) Slow precipitation of solid complex particles from a liquid containing the complex in solution by either (a) addition of antisolvent or (b) change in temperature to decrease solubility, or (c) evaporation of solvent;

(2) Slow precipitation of solid complexed particles from uncomplexed cuprous chloride or bromide in solution in a solvent having a lower solubility for the complex than for the uncomplexed CuCl or CuBr by either (a) addition of a diolefin, acetylene, nitrile, or carbon monoxide to e.g. dilute aqueous HCl or HBr or (b) addition of a diolefin, acetylene, nitrile, or carbon monoxide, and an antisolvent e.g. water;

(3) Slow precipitation of complex from uncomplexed solution of a different copper salt (e.g. cupric chloride or bromide dissolved in water) by either (a) addition of a diolefin, acetylene, nitrile, or carbon monoxide and a reactant to convert the different salt to cuprous chloride or bromide, e.g. a reducing agent or (b) addition of the reactants recited in 3(a) plus an antisolvent; and (4) As in (1), (2) and (3) except that a solid copper salt, preferably cuprous chloride or bromide having the large particle sizes recited above for the final new particles, is suspended (slurried) in a liquid mixture of a diolefin, acetylene, nitrile, or carbon monoxide and an activating material selected from the group consisting of monoolefin solvents for the CuCl or CuBr, alcohols, glycols and water and mixtures thereof and in which the desired diolegn, acetylene, nitrile, or carbon monoxide complex is less soluble than the copper salt, the said mixture having a slight solubility for the CuCl or CuBr so as to create a driving force whereby the diolefin, acetylene, nitrile, or carbon monoxide and activating material cause a phase boundary between cuprous salt and cuprous salt complex to move through the particle to in effect grow a new complexed particle. This new particle upon dissociation has the desired large pore pore structure.

It should be noted that in some embodiments of the preparations (1), (2) and (3) above, the complex is in solution only instantaneously and that the solid complex particles begin to nucleate and grow from the liquid complex immediately. This, however, does not interfere with the growth of the desired porous structure particles of relatively large size of this invention since under the proper conditions recited above growth is still favored over nucleation.

In each of the above methods any solvent for the copper salt may be utilized, i.e. organic or inorganic, the choice being dictated by the relative solubility of the cuprous chloride or bromide complex (more insoluble) vs. the solubility of the uncomplexed cuprous chloride or bromide. Suitable solvents for cuprous chloride or cuprous bromide are e.g. aqueous concentrated inorganic acids or aqueous dilute inorganic acids, (preferably the corresponding 2 to 12 normal HCl or HBr), and very concentrated aqueous inorganic salt solutions. Suitable solvents for cupric salts are e.g. water, alcohols, glycols, aqueous salt solutions, e.g. $NH_4Cl$, $NaCl$, $KCl$. It should be noted that a solvent should be chosen which does not contaminate the butadiene, acetylene, nitrile, or carbon monoxide complex of the cuprous chloride or bromide, i.e. the precipitate must not be contaminated, e.g. addition of butadiene and a reducing agent to cupric chloride in $H_2O$, etc. causes precipitation of uncontaminated complex due to the complete solubility of the cupric salts in the solvent.

Suitable antisolvents are any nonsolvents for the complex which are at least partially miscible with the primary solvent, e.g. water, $C_1$ to $C_{10}$ and higher alcohols, e.g. methanol, ethanol, isopropanol; water soluble ethers, e.g. diethyl ether, water soluble ketones, e.g. acetone and methyl ethyl ketone; water soluble esters, e.g. methyl acetate; caustic solutions, e.g. sodium hydroxide solution. It is noted that the term "antisolvent" includes materials which react with a solvent, e.g. sodium hydroxide to change the solvent medium.

It is noted that some solutions will involve partial or complete formation of a complex with the solvent. This will not present a problem so long as the solvent complex is less stable or more soluble than the desired solid butadiene, acetylene, nitrile, or carbon monoxide complex.

Preferably, unless the precipitation system involves extremely selective precipitation it is desirable to start with high purity cuprous chloride or bromide to prevent entrapment in the crystals of crystal lattice impurities which reduce the activity of the particles in the commercial complexing-decomplexing use of the particles, i.e. such impurities are barriers to movement of the ligand from the pore surface into the crystal lattice. Thus, it has been found that small amounts of impurities, e.g., 5% or above in the cuprous chloride or bromide produced greatly decreases activity, i.e., much more than could be attributed to the effect of this percent of inert material. Aside from effect on activity it has been found that cupric impurities cause contamination of the product by formation of organic chlorides.

It is also desirable to avoid contamination of the surface of the particles with diolefin, acetylene, or nitrile polymers or reaction products of these materials (or of diolefin, acetylene, nitrile, or carbon monoxide) with the solvent, produced in the preparation process, e.g., acid solvents in particular tend to react with unsaturates, etc. or cause condensation to form polymers. Preferred methods for limiting such contamination include utilizing low temperatures, limiting the amount of diolefin, acetylene, nitrile, or carbon monoxide supplied to only that amount needed to form the 100% complex, removing polymer, etc. formed by filtration, decanting, washing, etc.

Suitable complexing agents which can be used as described to prepare the active cuprous chloride and bromide of this invention are any normally gaseous or liquid complexing compounds which form a stable complex having a ratio of copper to complexing compound greater than 1, preferably 2 or more. Such compounds are those having more than 1 pi bond per molecule. Such compounds include both materials which form only complexes having said ratios of copper to complexing compound greater than 1 and compounds which form complexes having a ratio of 1 or less which upon decomplexing pass through a stable complex having a ratio of copper to complexing compound greater than 1. Thus, the present inventor has found experimentally that certain materials, e.g. nitriles, diolefins, acetylenes, carbon monoxide under ordinary conditions forming a 2:1 complex can be made to complex in ratios of copper to complexing compound of 1:1 or less. However, upon dissociation complexing material is released selectively from the bed of cuprous chloride or bromide until the stable above 1:1, i.e. 2:1 stoichiometric complex is completely formed before further decomplexing to the uncomplexed cuprous chloride or bromide occurs. In this specification by "stable complex" is meant a stoichiometric complex stable upon dissociation as described in the preceding sentence. As will be further discussed in the examples in connection with the experimental data it is the stable complex having a ratio of copper to complexing material of above 1:1 from which the large pores develop upon dissociation (due to the bonding of one molecule of the complexing material to more than one copper atom). It is noted that wherever in this specification diolefins, acetylenes, nitriles, or carbon monoxide are mentioned in connection with the preparation technique it is intended that these other compounds can be used. Preferred materials are carbon monoxide, HCN, and $C_2$–$C_{12}$ or higher organic compounds containing at least one of the following functional groups:

(1) 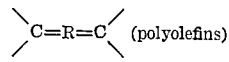 (polyolefins)

(2) —C≡C— or (3) —C≡N and mixtures of these, wherein R is C or an alkylene group. More than one of these functional groups may be present in a single molecule. In addition other functional groups may be present so long as these do not interfere with complex formation. Preferred materials are $C_3$ to $C_{10}$ or higher, preferably $C_3$ to $C_6$ conjugated or nonconjugated aliphatic, cyclic or alicyclic diolefins, or less preferably polyolefins, e.g. allene, butadiene, isoprene, piperylene, octadienes, cyclohexadiene, cyclooctadiene, divinyl benzene, cyclododecatriene; $C_2$ to $C_{10}$ or higher, preferably $C_2$ to $C_6$ aliphatic or alicyclic acetylenes or acetylenes containing additional unsaturation, acetylene, methyl acetylene, propyl acetylene, phenyl acetylene, vinyl acetylene, etc.; and $C_2$ to $C_{10}$ or higher, preferably $C_2$ to $C_6$ aliphatic or alicyclic saturated or unsaturated nitriles, e.g. acetonitrile, acrylonitrile, propionitrile, phenylnitrile, methacrylonitrile, ethacrylonitrile, etc. Pure streams or dilute streams (diluted with an inert gas or natural dilute petroleum streams, e.g. butadiene diluted with butene and butanes) can be used so long as the diluene does not interfere with the precipitation of the desired solid complex.

Reaction conditions for the above described precipitation or growth of the desired new particles of this invention are in general the well known temperatures and pressures within which the desired complex is stable. In general suitable stable temperatures and pressures varying with the particular complex are in the range of —80 to 80° C., preferably —20 to 30° C., and pressures are in the range of 1 to 165 p.s.i.a., preferably 15 to 50 p.s.i.a. In general higher pressures and lower temperatures within the above ranges as is well known stabilize the complexes.

Examples of methods of preparation and preferred conditions to favor growth of relatively large, strong, uniform, unitary particles are as follows:

(1) Precipitation from solvent containing the cuprous complex in solution by addition of an antisolvent The liquid cuprous complex may be produced in a variety of ways. One technique for preparing the liquid cuprous chloride or bromide complex is to bubble gaseous diolefin, acetylene, nitrile, or carbon monoxide through an aqueous solution of the cuprous salt. Other known means for forming the particular liquid complexes are also useful. As an example of a preferred procedure, butadiene gas may be bubbled through a saturated solution of cuprous chloride in concentrated HCl until essentially no more butadiene is absorbed thus forming an aqueous acidic solution of the CuCl-butadiene complex.

In lieu of employing gaseous diolefins, acetylenes, or nitriles, to complex with the cuprous salt in solution, liquids may be used. As an example liquid butadiene, in excess, may be contacted with an HCl solution saturated with CuCl, and with good agitation similar results are produced. It is to be understood that the manner in which the liquid complex is formed is a matter of choice depending largely on the equipment and materials available. Preferably to prevent polymer formation and formation of chlorinated diolefin, acetylene, or nitrile materials the following conditions are utilized: Acid concentration low, cuprous salt concentration high, temperature low, use of stoichiometric amount only of the diolefin, acetylene, nitrile, or carbon monoxide, filtration or settling to remove polymer and other contaminants prior to adding antisolvent.

To effect precipitation the precipitating medium, e.g. water, is preferably added slowly, e.g. dropwise, to the cuprous chloride or bromide complex containing solution. Large regular crystals are thereby obtained. A somewhat less preferred alternate comprises adding the CuCl or CuBr complex solution slowly, e.g. dropwise, to a reasonably large quantity of the precipitating medium. A refinement of this step involves spraying a mist of the liquid complex solution into the precipitating medium. By adding the liquid complex in a concentrated form to the precipitating medium an explosive crystallization is effected whereby the solid particles initially obtained are reasonably small in average particle size but grow as addition continues. In either preparation preferably the solutions are purged with the diolefin, acetylene, nitrile or carbon monoxide during precipitation to prevent any decomposition of complex.

In either preparation concentrations of CuCl or CuBr in solution are preferably 1 to 60 wt. percent, more preferably 5 to 25 wt. percent. Time for addition to effect precipitation is preferably ⅙ to 10 hours, more preferably 1 to 5 hours. The amount of precipitation medium (i.e. antisolvent) is preferably 0.2 to 10, more preferably 1 to 5 vol. per vol. of complex solution.

The precipitated crystalline product is then separated from the solution and preferably dried with isopropyl alcohol or by any conventional drying means before dissociation. The dried complex is preferably maintained in a non-oxidizing atmosphere in order to avoid formation of cupric salts. The precipitated cuprous salt complex is then dissociated under controlled conditions to provide the present new cuprous salt which is many times more active than the initial cuprous salt employed in preparing the liquid complex. The conditions required for dissociation will obviously depend on the specific complex employed since each has its own dissociation pressure curves shown in the literature and in co-pending application Serial No. 115,684, filed June 8, 1961, now U.S. 3,206,521.

(2) Precipitation from uncomplexed cupric chloride or bromide in solution

Cupric chloride or bromide is dissolved in a solvent, e.g. water or alcohol, and a liquid or preferably gaseous diolefin, acetylene, nitrile, or carbon monoxide is mixed with the solution while at the same time a reducing agent is added. The reducing agent, e.g. $SO_2$ or $Na_2SO_3$, is preferably added very slowly so as to produce cuprous salt slowly enough so that the formation of the complex does not deplete the solution of supersaturation with the diolefin, acetylene, nitrile, or carbon monoxide. Preferably, the reducing agent is added in a dilute solution miscible with the solvent for the cupric chloride so as to favor growth of large particles. Where a gaseous reducing agent is used it is preferably diluted with an inert gas. It is also noted that the cuprous chloride formed is usually and preferably more soluble than the complex, thus also favoring growth of the complex particles. Time for addition of reducing agent is preferably ⅙ to 10, more preferably 1 to 5 hours.

(3) Slurry of solid CuCl or CuBr with liquid complexing material and an activating agent Solid cuprous chloride or bromide is suspended (slurried) in a liquid mixture of a diolefin, acetylene, nitrile, or carbon monoxide and an activating material selected from the group consisting of monoolefin solvents for CuCl or CuBr, alcohols, glycols, and water and mixtures thereof and in which the CuCl or CuBr is more soluble than the complex, the said mixture having a slight solubility for the CuCl or CuBr so as to create a driving force whereby the diolefin, acetylene, nitrile, or carbon monoxide and activating material cause a phase boundary between cuprous salt and cuprous salt complex to move through the particle to in effect grow a new complexed particle. This new particle upon dissociation has the desired large pore porous structure.

Suitable activating agents for this slurry technique are $C_1$–$C_{10}$, preferably $C_1$–$C_3$ monoalcohols and $C_1$–$C_{10}$, preferably $C_2$–$C_6$ glycols, water, dilute acids preferably halogen acids, and $C_4$ to $C_8$ branched or straight chain olefins having appreciable solubility as pure materials for the cuprous salt. Particularly preferred monoolefins are butene-1, isobutylene, pentene-1 and hexene-1 because of their high solubility for CuCl and CuBr. Particularly preferred alcohols are methyl, ethyl and n-propyl. Particularly preferred glycols are ethylene and propylene glycol. It should be noted that the activating material and complexing material must be present in the liquid phase in the slurry operation. Thus, it has been found that gas phase operations (e.g. crude butadiene which contains large amounts of isobutylene and butene-1) even conducted near the dew point so that trace condensation occurs on the commercial CP CuCl or CuBr is not effective to produce the new large pore porous CuCl or CuBr of this invention (see Example 1B). It is noted that operation at the dew point for long periods of time is equivalent to slurry operations. It is further noted that the activating agent may be dissolved in the liquid complexing agent or the complexing agent may be dissolved in the activating agent.

The amount of activating agent used is not critical. Small amounts or large may be used although to some extent more large pore porosity is obtained with larger amounts. Thus, any amount up to 90 wt. percent or more based on the total liquid mixture, preferably 10 to 50 wt. percent may be used. It is also especially preferred to start with relatively pure CuCl or CuBr preferably above 90 wt. percent, more preferably above 97 wt. percent, since contaminants in the crystal seem to block development of large pore porosity upon decomplexing besides also decreasing mechanical strength of the CuCl or CuBr produced.

It is preferred to start with CuCl or CuBr of the same particle size as the preferred final particle size described above, but preferably of a particle size greater than that ordinarily commercially supplied, although somewhat larger sizes may be used. It has been found that the initial and final particle sizes tend to remain the same probably because a single particle becomes complexed by a phase boundary between cuprous salt and cuprous salt complex moving through the particle. It is noted that smaller sized initial particles may also be used where large amounts of solvent are used and if sufficient time for growth of particles from CuCl or CuBr complex in solution (from redissolving of other particles) is permitted. However, this really falls within the other preparations, i.e. precipitation from solution described above.

The time required for slurry contacting to produce the new particles of this invention depends to some extent upon the amount of solvent employed, temperature, etc. This time can be easily determined experimentally. However, in general it is preferred to effect contacting for 0.1 to 20 hours, preferably 0.5 to 5 hours.

It is noted that in a much less preferred embodiment some large pore porous structure and some improvement in activity, etc., over prior art CuCl or CuBr can be obtained by liquid phase slurrying as above described in the absence of a solvent.

It is noted that although both the cuprous chloride and the cuprous bromide new complexing agents of this invention used in commercial complexing separations provide real improvements over prior art material, the new cuprous chloride complexing agent is preferred. Thus, the new cuprous chloride as compared to the new cuprous bromide, complexes at higher temperatures and/or lower pressures and additionally has higher activity (shorter gas residence times may be used).

It is preferred to dissociate the complex both in preparation of the active particles and especially in multicycle use in effecting commercial separations in the substantial absence of liquids, i.e., to efficiently strip or wash the particles of liquids including those wetting the surface and pores before effecting dissociation of the complex in the decomplexer and also in the prestripper where partial dissociation is used to obtain higher product purities. This is necessary because it has been found that liquids having some appreciable solubility for the complex, present during dissociation, tend to anneal the large pores and thus reduce activity. Alcohols have been found to be particularly deleterious and liquid monoolefin solvents such as butene-1, isobutylene, pentene-1, and hexene-1 also should be excluded. It is noted that some of these such as isobutylene and butene-1 tend to be completely stripped in raising temperatures for dissociation but it is still preferred to use care to obtain essentially complete removal before the dissociation or partial dissociation stripping step. Other deleterious materials are liquid nitriles and water. It is noted that the dissociation step appears to be critical, i.e., the main annealing occurs when these liquids are present during dissociation and little annealing occurs at other stages in the preparation or commercial use of the particles.

Finally and of very great importance it is preferred to conduct complexing in the vapor phase at a temperature within 15° C. preferably within 10° C., more preferably within 5° C. of the dew point. It has been found that with the new high large pores (550/10,000 A.) porosity particles which also contain small amounts of small, e.g., 70–500 A. pores, these small pores permit partial condensation in these pores and nucleation occurs to obtain much higher capacities and activities than are otherwise obtained.

The present new cuprous chloride and bromide particles may be used in effecting more economic separations of any compound capable of forming a complex with cuprous chloride or cuprous bromide. Thus, this includes all the separations described in the voluminous prior art previously referred to and additional compounds which it has been discovered complex with cuprous chloride and bromide. Preferred materials which complex with cuprous chloride or bromide are inorganic materials such as carbon monoxide and organic materials containing up to about 16 carbon atoms, preferably up to about 12 carbon atoms, more preferably up to about 8 carbon atoms. The higher boiling materials can be complexed in the vapor phase by techniques such as the use of vacuum, carrier gases, etc. Any materials may be used as carrier gases which do not interfere with the complexing reaction, e.g., inert gases, organic or inorganic materials. Examples of preferred materials which complex with cuprous chloride or bromide are $C_2$–$C_{16}$, preferably $C_2$–$C_{12}$, more preferably $C_2$–$C_8$, compounds having one or more of the following functional groups through which the complex is capable of being formed:

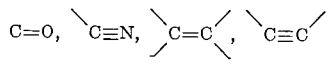

Carbon monoxide is suitable for use as the ligand. Additionally, unsaturated carbonyl compounds such as propenal, butenal, pentenal, and the like; the various unsaturated ketones such as 1-butene-3-one, 1,4-pentadiene-3-one, 2-pentene-4-one, and similar ketones may be employed. In general the alkane nitriles such as methane nitrile, ethane nitrile, propane nitrile, and higher nitriles are useful. Aryl, alkaryl and arylalkyl nitriles also complex with cuprous salt and may be used to form the liquid complex precursor. Unsaturated nitriles, such as acrylonitrile, methacrylonitrile, and ethacrylonitrile are further examples of ligands suitable for use in the present process. Ligands having a combination of functional groups selected from the list recited above are less preferred alternates. Also, other functional groups may be present so long as these do not interfere with complex formation.

Examples of olefins are ethylene, propylene, butylene, isobutylene, pentenes, etc. While alpha, non-alpha, straight and branched chain olefins are all employable, alpha olefins appear to complex more readily, presumably due to the absence of steric hindrance and are preferred. Di and triolefins such as propadiene, butadiene, isoprene, dicyclopentadiene, cyclopentadiene, octadiene, cyclododecatriene and the like, readily complex. Olefinic aromatic compounds such as styrene and the like may also be employed. The acetylenes such as methyl, ethyl, vinyl, propyl acetylenes and the like, as well as acetylene per se are also useful as ligands. It should be noted that compounds containing functional groups in addition to the functional group(s) through which the complex is formed may also be employed since they do not ordinarily interfere with complexing. Also, compounds containing more than one functional group through which the complex is capable of being formed may by proper choice of conditions (chosen based on the temperature pressure dissociation curve) be separated from another compound having one of the same functional groups, e.g., acrylonitrile from acetonitrile.

Complexing conditions may be chosen to be any temperature and pressure conditions under which a complex forms between the cuprous chloride or bromide and one of the compounds present in the mixture. These conditions may be chosen to effect vapor phase, liquid phase or mixed vapor liquid phase contacting with the cuprous halide. Similarly, decomplexing conditions may be chosen to be any temperature and pressure conditions under which the compound complexed dissociates, again vapor phase, liquid phase or mixed vapor liquid phase. In general for complexing temperatures are in the range of −80° C. to 100° C., pressures in the range of 0.5 to 125 atmospheres and residence times in the range of for feed 1 second to 2 hours, for cuprous halide 5 minutes to 2 hours. Particularly preferred complexing conditions for liquid phase contacting of the cuprous halide are temperatures of −50° C. to 40° C., pressures of 1 to 100 atmospheres and contact times of 5 minutes to 2 hours. In general for decomplexing temperatures are in the range of −20° C. to 150° C., pressures in the range of 0.1 to 100 atmospheres and cuprous halide residence times of 1 minute to 2 hours.

Preferred new processes in one embodiment are processes for separating any of the compounds described above from mixtures with other compounds, except separations of diolefins from mixtures containing appreciable quantities (e.g. above 2 wt. percent) of monoolefins, carried out by contacting the solid highly porous cuprous chloride or bromide of this invention, under vapor phase, liquid phase or mixed vapor liquid phase conditions as described above in the absence of the presence of appreciable quantities (e.g. 1% or more) of water or alcohols.

In another embodiment preferred new processes are processes for separating any of the compounds described above from mixtures with other compounds including diolefins from monoolefins carried out by contacting the solid highly porous cuprous chloride or bromide of this invention under vapor phase conditions as described above.

A preferred apparatus for carrying out the preferred process (circulation of solids between two fluidized beds one operated on absorption and one on desorption) for utilizing the present new cuprous chloride or bromide particles is depicted in the accompanying drawing, FIGURE 4. Referring to the drawing vaporous feed is supplied through line 1 to complexer reaction vessel 2 containing a bed of cuprous chloride or bromide particles supported on distribution plate 3 and fluidized by the feed vapors. The reaction vessel is 2 ft. in diameter and contains approximately 100 1″ O.D. heat transfer tubes to remove the enormous heat released in complexing. The distribution of these tubes is shown in the cross sectional view FIG. 4A (thru A—A) of the reactor vessel 2 showing the heat transfer tubes 4. As can be seen the free area is only approximately 80% of the total area. Tail gas vapors leaving the fluid bed are passed overhead through line 5 to cyclone 6 from which entrained solids are returned to the reactor through line 7 and tail gas is removed through line 8. Desorbed particles are supplied near the top of the fluid bed through line 9 and flow downwardly through the fluid bed and bypass the distribution plate 3 through downcomers (not shown) to a stripper 4 where they are heated and/or stripped of nonselectively absorbed feed. Stripping gas may be supplied through line 10 or stripping may be effected primarily by heating. Particles are then passed upward through lift line 11 with lift gases being supplied through line 12 to the upper section of the fluid bed of decomplexer 13. This decomplexer also contains the approximately 100 heat transfer tubes described in connection with the complexer vessel 2. Particles flow downward through the fluid bed in vessel 13 where they are fluidized by fluidization stripping gas supplied through line 14, the particles again being supported by a gas distribution baffle 15. Overhead gases containing the desired product separated are passed through line 16 to cyclones 17 where solids entrained are separated and returned through line 18 to the reactor and the desired pure product gases are passed from the system through line 19 to storage. Desorbed cuprous chloride or cuprous bromide particles are passed through line 20 back to reactor 2 through lift line 21 with lift gases being supplied through line 22. In an especially preferred embodiment all of the stripping and lift gases are the product and tail gases respectively from the process. Thus, the stripping gas for the decomplexer and for the stripper and the lift gas to transport the CuCl or CuBr to the decomplexer is the high purity product gas (prevents contamination or dilution of the product gas). With respect to the lift gas used to supply decomplexed particles to the complexer this is the tail gas from the absorber. Thus, no additional impurities or dilution of the tail gas occurs. Of course, other stripping and lift gases, e.g. nitrogen, hydrocarbons, etc. can be used but these should be chosen so as not to interfere with complexing or decomplexing and so as to be separable, e.g. by distillation from the pure product recovered by complexing and also preferably from the tail gas.

In a preferred embodiment to obtain maximum product purity the particles withdrawn from the bottom of the absorber are slowly and uniformly heated as they pass downwardly through the stripper, the heat being supplied either by heat transfer tubes (not shown) or by heated stripping gas, preferably by both. Preferably residence times and temperatures are adjusted to obtain partial decomplexing of 1–10%, preferably 3–6%, of the compound complexed contained in the particles. The amount of stripping gas is preferably limited both to effect savings in stripping gas requirements and in the preferred embodiment where product gas from the desorber is used as the stripping gas to minimize recontamination of the particles by impurities contained in said stripping gas. Preferred amounts of stripping gas are 1–10 vol. percent, preferably 2–7 vol. percent, based on the amount of gas contained in the complexed particles passed to the stripper. In an additional preferred embodiment to obtain very high purity product the final stripping is conducted substantially with gases evolved from the partial decomplexing of the particles or with a minimum amount of additional stripping gas, preferably product gases, or more preferably a pure stripping gas such as nitrogen, to permit smooth flow of the particles. This latter embodiment provides maximum protection against contamination both by impurities in the stripping gas and by impurities in the gases evolved from the particles (impurities swept off the surface). The extremely high purities obtained in the separation of butadiene from refinery $C_4$ streams (e.g. from steam cracking) by expedients such as described above are reported in Example 28.

Preferred complexing and decomplexing conditions used for effecting preferred commercial separations using preferably the above described system are as follows: (Preferred superficial velocity fluidization rates 0.05–5.0, preferably 0.15–1.0 ft./sec.).

BUTADIENE SEPARATED FROM CRUDE BUTADIENE

| | Preferred | Most Preferred |
|---|---|---|
| Complexing: | | |
| Temperature, ° C | −10 to 70 | 0 to 40. |
| Pressure, Atmos | 0.5 to 10 | 1 to 5. |
| Gas Residence Time, seconds | 1 to 400 | 15 to 150. |
| Solids Residence Time, minutes | 10 to 200 | 20 to 100. |
| Decomplexing: | | |
| Temperature, ° C | 40 to 100 | 60 to 90. |
| Pressure, Atmos | 0.5 to 10 | 1 to 5. |
| Gas Residence Time, seconds | 1 to 400 | 15 to 150. |
| Solids Residence Time, minutes | 5 to 200 | 10 to 100. |

ETHYLENE SEPARATED FROM STEAM CRACKING $C_2$- STREAM

| | Preferred | Most Preferred |
|---|---|---|
| Complexing: | | |
| Temperature, ° C | −50 to 40 | −30 to 20. |
| Pressure, Atmos | 1 to 100 | 10 to 60. |
| Gas Residence Time, Seconds | 1 to 400 | 15 to 150. |
| Solids Residence Time, minutes | 10 to 200 | 20 to 100. |
| Decomplexing: | | |
| Temperature, ° C | −5 to 100 | 35 to 75. |
| Pressure, atmos | 1 to 100 | 10 to 60. |
| Gas Residence Time, seconds | 1 to 400 | 15 to 150. |
| Solids Residence Time, minutes | 5 to 200 | 10 to 100. |

ACRYLONITRILE SEPARATED FROM ACETONITRILE

| | Preferred | Most Preferred |
|---|---|---|
| Complexing: | | |
| Temperature, ° C | −10 to 80 | 0 to 50. |
| Pressure, atmos | 0.5 to 10 | 1 to 5. |
| Gas Residence Time, seconds | 1 to 400 | 15 to 150. |
| Solids Residence Time, minutes | 10 to 200 | 20 to 100. |
| Decomplexing: | | |
| Temperature, ° C | 50 to 140 | 70 to 120. |
| Pressure, atmos | 0.5 to 10 | 1 to 5. |
| Gas Residence Time, seconds | 1 to 400 | 15 to 150. |
| Solids Residence Time, minutes | 5 to 200 | 10 to 100. |

Note.—For the nitrile separations an inert carrier gas, such as $N_2$, $CH_4$, etc., must be used to prevent condensation at the high pressures.

CARBON MONOXIDE SEPARATED FROM HYDROGEN

| | Preferred | Most Preferred |
|---|---|---|
| Complexing: | | |
| Temperature, ° C | −25 to 100 | −10 to 60. |
| Pressure, atmos | 0.5 to 100 | 1 to 60. |
| Gas Residence Time, seconds | 1 to 400 | 15 to 150. |
| Solids Residence Time, Minutes | 10 to 200 | 20 to 100. |
| Decomplexing: | | |
| Temperature, ° C | 20 to 140 | 40 to 120. |
| Pressure, atmos | 0.5 to 100 | 1 to 60. |
| Gas Residence Time, seconds | 1 to 400 | 15 to 150. |
| Solids Residence Time, minutes | 5 to 200 | 10 to 100. |

ALLENE SEPARATED FROM METHYL ACETYLENE

| | Preferred | Most Preferred |
|---|---|---|
| Complexing: | | |
| Temperature, ° C | −40 to 70 | −20 to 40. |
| Pressure, atmos | 0.5 to 25 | 1 to 15. |
| Gas Residence Time, seconds | 1 to 400 | 15 to 150. |
| Solids Residence Time, minutes | 10 to 200 | 20 to 100. |
| Decomplexing: | | |
| Temperature, ° C | 30 to 115 | 50 to 100. |
| Pressure, atmos | 0.5 to 25 | 1 to 15. |
| Gas Residence Time, seconds | 1 to 400 | 15 to 150. |
| Solids Residence Time, minutes | 5 to 200 | 10 to 100. |

PIPERYLENES SEPARATED FROM CYCLOPENTENE

| | Preferred | Most Preferred |
|---|---|---|
| Complexing: | | |
| Temperature, ° C | −10 to 80 | 0 to 70. |
| Pressure, atmos | 0.1 to 5 | 1 to 3. |
| Gas Residence Time, seconds | 1 to 400 | 15 to 150. |
| Solids Residence Time, minutes | 10 to 200 | 20 to 100. |
| Decomplexing: | | |
| Temperature, ° C | 40 to 125 | 60 to 110. |
| Pressure, atmos | 0.1 to 5 | 1 to 3. |
| Gas Residence Time, seconds | 1 to 400 | 15 to 150. |
| Solids Residence Time, minutes | 5 to 200 | 10 to 100. |

Note.—To operate with piperylenes at low temperature and the higher pressures a carrier gas such as nitrogen must be used.

The present invention will be more clearly understood from a consideration of the following examples and the laboratory data contained therein.

EXAMPLE 1.—HCl SOLN. OF CuCl-BUTADIENE COMPLEX ADDED TO WATER 8000 ml. of concentrated HCl and 100 g. of copper pellets were charged to a 12 liter beaker, sparged below the surface with C.P. butadiene. 4472 g. of CuCl (which had been recovered from a slurry of equal weights of concentrated HCl and Baker's C.P. CuCl which was stirred at 22° C. under a CO atmosphere in the presence of copper pellets to clean the surface) were then added and the mixture was stirred while continuing butadiene purge for about one hour to dissolve the cuprous chloride. Undissolved solids were filtered off and 4500 ml. of the saturated solution was transferred to a resin pot, 50 g. of copper pellets were added (to reduce any cupric salts present) and the mixture was purged with butadiene below the surface (with stirring) for about four hours at 30° C. until a second liquid phase appeared. The solution was then slowly added over a period of about 10 hours to five times its volume of distilled water also at about 30° C. saturated with butadiene and blanketed with butadiene. A light yellow precipitate of complex began to form as soon as the acid solution hit the water. The total precipitate formed was filtered off, and washed with isopropyl alcohol and then diethylether to remove water and butadiene polymer from the crystals of complex. The ether was removed by blowing gaseous butadiene through the bed of complex crystals and the final product was bottled under a butadiene atmosphere. Analysis of the complex crystals showed that the crystals contained 100% of the theoretical amount of butadiene. The present invention highly active CuCl was obtained by dissociating these crystals. It is noted that porosimeter pore volumes and activity and capacity data in fluid bed tests along with other data on the active CuCl prepared in this example and in most of the following examples is presented in Example 20.

EXAMPLE 1A.—HCl SOLN. OF POLYMER CONTAMINATED CuCl-BUTADIENE COMPLEX ADDED TO WATER

A saturated solution of cuprous chloride was prepared by adding 1935 g. of commercial C.P. CuCl and 100 g. of copper pellets to 6 liters of concentrated HCl at 22° C. and stirring for 30 minutes followed by filtering off the undissolved solids (540 g.). The saturated solution was then charged to a 10 liter reaction flask and C.P. butadiene (99%) vapor was added below the surface through a sparger tube. The flask was also provided with a Dry-Ice-alcohol condenser to reflux any unreacted butadiene to the CuCl solution. The butadiene was added over a period of 3 days and an insoluble liquid layer of over 1 liter formed on the top surface of the solution. The temperature during the entire addition of butadiene was maintained between 17 and 36° C. The oil layer was decanted and distillation and analysis of the cuts obtained from this upper oil layer showed that it contained large amounts of chlorobutenes, hydrochlorinated butadiene polymers as well as other butadiene polymers. The entire remaining solution was filtered and 360 gms. of 1–4 mm. diameter tetrahedral uncomplexed CuCl crystals were obtained. The filtrate was divided into two parts and about six volumes of water was added slowly to one of them at room temperature. This resulted in the precipitation of 369 g. of unidentified greenish white semi-amorphous crystals which on heating to 175° C. yielded about 4 wt. percent of a liquid distillate, probably polymer, the remainder being relatively active CuCl (dissociated due to the heating step). This technique is very wasteful of both HCl and butadiene and presents a difficult washing problem to remove the chlorinated polymers from product crystals. In addition the cuprous chloride is considerably less active than optimum. This example also shows that where the temperature is high and the time of butadiene addition is long in the complexing step excess formation of polymer and other contaminating by-products dilutes the acid causing uncomplexed cuprous chloride to precipitate out.

EXAMPLE 1B.—UNCOMPLEXED CuCl RECRYSTALLIZED FROM HCl

A saturated solution of Baker's C.P. cuprous chloride is concentrated HCl (12 N) was prepared as described in Example 1 and the solution was added to six volumes of water at room temperature. The precipitate formed was filtered off and washed with isopropyl alcohol and then diethyl ether. The ether was recovered by blowing gaseous nitrogen through the crystals. The material was found to have very poor large pore porosity (from electron microscope replica picture), and capacity and activity in fluid bed tests. Thus, this example is presented to show that even the best cuprous chloride prepared absent the present invention, i.e. 100% pure cuprous chloride having the desired particle size for fluidization but without the desired porosity is markedly inferior to the present invention material.

EXAMPLE 1C.—EVAPORATED BUTENE-1 SOLUTION OF COMPLEX OF CuCl WITH BUTENE-1

9½ cu. ft. of gaseous butene-1 were condensed at atmospheric pressure in a 2-liter resin flask cooled to −10° C. and 200 gms. of Baker and Adamson C.P. cuprous chloride was then added. The mixture was stirred for 2 hours and then undissolved material was allowed to settle out before decanting the clear cuprous chloride-butene-1 solution to another cooled resin pot. Butene-1 was evaporated off at atmospheric pressure to crystallize out the CuCl-butene-1 complex. When most of the butene-1 had been removed and the solid complex was in the form of an essentially dry pale yellow powder it was transferred to a tared flask at Dry Ice temperature. The flask was allowed to warm up to room temperature and the gaseous butene-1 that was evolved was metered through a wet test meter. After the first 3.5 liters of gas came off the cuprous chloride-butene-1 complex was completely dry and broke into small pieces when the flask was shaken. Then an additional 5.9 liters of gas came off when the flask was heated to 35° C. The flask was reweighed after all the butene-1 was removed and showed that 161 g. of cuprous chloride was present in the flask. Although the amount of gas evolved in the two steps measured was less than theoretical for the 1:1 olefin complex it is believed that this was clearly due to decomplexing occurring prior to such measurement and that the complex was initially substantially 100% of theoretical. This material was found to have very poor large pore porosity and activity and capacity in fluid bed tests. Thus, this example is presented to show that materials complexing only 1:1 e.g. olefins are markedly inferior to the present invention material.

EXAMPLE 2.—WATER ADDED TO HCl SOLUTION OF CuCl-BUTADIENE COMPLEX

To 1300 ml. of concentrated HCl, 450 g. of Baker's C.P. cuprous chloride were added along with 25 g. of copper pellets. Two ft.$^3$ of butadiene were added to the solution in a stirred vessel over a 1-hour period and the temperature rose from 22° C. to 31° C. At the end of this period traces of oily polymer began to appear. One liter of water was then added dropwise over 2 hours and ten minutes, to the concentrated HCl solution purged with butadiene. An additional 9 liters of water were added over a subsequent 1½ hours. An excellent cuprous chloride of average particle size of over 100 microns having a generally uniform size and spherical shape was obtained. This material was found to have excellent fluidization properties over an extremely wide range of gas rates.

EXAMPLE 3.—HCl SOLUTION OF CuCl-ALLENE COMPLEX ADDED TO WATER

The same procedure as that of Example 1 (except that no preliminary slurry cleaning of the surface of the cuprous chloride particles was conducted) was used on a sample of commercial C.P. CuCl except that allene (1,3-propadiene) was used instead of butadiene. The yield of dried crystalline complex of allene with CuCl was somewhat less than for the butadiene complex and the final crystals contained 83% of the theoretical amount of allene.

EXAMPLE 4.—ACETYLENE ADDED TO HCl SOLUTION OF CuCl PRECIPITATES COMPLEX DIRECTLY

The same general procedure of Example 1 (except that the CuCl saturated solution was prepared by adding reagent grade $Cu_2O$ to the HCl) was used to effect precipitation except that acetylene was used instead of butadiene. Following addition of the acetylene a yellow precipitate was filtered off and the clear solution was added slowly to 12 liters of water. A deep purple sludge was formed which turned black and a black powder was recovered which was found upon analysis to be CuCl and free carbon. The initial yellow precipitate found to be the desired complex of acetylene with CuCl was very much less than for the butadiene complex and the final crystals contained 50% of the theoretical amount of acetylene. This experiment indicates that diolefins are much preferred to acetylene but that acetylene may also be used.

EXAMPLE 4A.—HCl SOLUTION OF CUPROUS CHLORIDE METHYL ACETYLENE COMPLEX ADDED TO WATER 1500 cc. of a room temperature saturated solution of Baker's analyzed cuprous chloride (copper pellets added to reduce any cupric chloride present) was prepared. This solution was purged with methyl acetylene and then 6000 cc. of water at 0.5° C. was added dropwise over a 2-hour period while purging with 5.2 ft.$^3$ of methyl acetylene. No visible precipitate was formed until above 1500 cc. of water had been added (cloudiness appeared). The final precipitate was recovered by filtration, washed twice with isopropyl alcohol and then twice with ethyl ether (in a methyl acetylene atmosphere) and the ether was finally removed by fluffing with methyl acetylene. 260 grams of the complex were recovered. Microscopic examination revealed the typical (for good activity) transparent complexed crystals which became opaque upon dissociation. They had a short rod shape.

EXAMPLE 5.—HBr SOLUTION OF CuBr-BUTADIENE COMPLEX ADDED TO WATER

A similar procedure to that of Example 1 was used to prepare active cuprous bromide from a sample of B&A C.P. cuprous bromide (dissolved in HBr). The yield of dried crystalline complex of butadiene with CuBr was approximately equal to that of the butadiene complex and the final crystals contained 82% of the theoretical amount of butadiene.

EXAMPLE 6.—LIQUID $SO_2$ ADDED TO ANHYDROUS EtOH SOLUTION OF $CuCl_2$ AND LIQUID BUTADIENE 40 g. of reagent grade Baker and Adamson cupric chloride were dissolved in 100 ml. of anhydrous ethyl alcohol, the solution was cooled to −25° C. and 15 ml. of liquid C.P. 1,3-butadiene were added. 20 ml. of liquid anhydrous $SO_2$ was then added dropwise over a period of 5 minutes. A brownish yellow precipitate formed and the mother liquor was decanted off. The precipitate was then slurried with 200 ml. of distilled water and became bright yellow. The precipitate was filtered off, washed with 100 ml. of isopropanol, followed by 100 ml. of cold diethylether, and finally dried in a stream of 1,3-butadiene. Microscopic examination of the crystals showed the typical structure of the 2CuCl:butadiene complex. Analytical data showed 92% of the theoretical amount of butadiene in the crystals.

EXAMPLE 7.—$Na_2SO_3$ WATER SOLUTION ADDED TO BUTADIENE PURGED WATER SOLUTION OF $CuCl_2$ 454 g. of Matheson, Coleman, & Bell cupric chloride ($CuCl_2 \cdot 2H_2O$) were dissolved in 4000 ml. of water, the solution was cooled to 10° C. and then the solution was purged with butadiene. 2000 ml. of an 18 wt. percent $Na_2SO_3$ water solution was added dropwise over a period of about 1 hour while continuing to purge with butadiene. A yellow precipitate was obtained which by microscopic examination was the 2CuCl:butadiene complex and which upon dissociation had the desired porous structure (electron microscope replica picture taken).

EXAMPLE 8.—$SO_2$ AND BUTADIENE GASES ADDED TO WATER SOLUTION OF $CuCl_2$ 454 g. of Matheson, Coleman, and Bell cupric chloride ($CuCl_2 \cdot 2H_2O$) were dissolved in 2000 ml. of water. The solution was cooled to 15° C. and then purged with gaseous butadiene and $SO_2$ over a period of 4 hours. A yellow precipitate was obtained which by microscopic examination was the 2CuCl:butadiene complex and which upon dissociation had the desired porous structure (electron microscope replica picture taken).

EXAMPLE 9.—HCl SOLUTION OF CuCl-ACETONITRILE COMPLEX ADDED TO WATER

A room temperature saturated solution of CuCl in concentrated HCl (12 N) was prepared by dissolving C.P. CuCl and filtering. 900 cc. of the solution was mixed with 900 cc. of acetonitrile. The mixture was added dropwise to 8 liters of $H_2O$ containing 92 cc. of acetonitrile over a period of 2 hours. A white precipitate began to form as soon as the mixture was added. The product was filtered and washed with alcohol and ether and fluffed with nitrogen saturated with acetonitrile at room temperature. The product contained 29 wt. percent acetonitrile, i.e. 1:1 mol ratio and upon dissociation was found to have the desired large pore porous structure and high capacity and activity in fluid bed test. It should be noted that from other data obtained by the present inventor it is known that acetonitrile complexes in at least two stoichiometric forms of the complex which dissociate stoichiometrically, i.e. the less stable 1:1 complex dissociates completely to the 2:1 complex and only then to the decomplexed state. This was experimentally found to occur with the present particles, i.e. in a particle being dissociated under the microscope first a milky haze indicating very fine pores appeared and then the typical large pore material of this invention appeared i.e. opaque under transmitted light and solid white under reflected light due to the large pores appearing. By comparison non-porous particles are more transparent, and are glossy under reflected light. This example indicates that so long as the particles precipitated as the complex from solution on dissociation go through stoichiometric complex greater than 1:1, e.g. 2:1 the active large pore material is obtained. It should be noted that it will be shown in another Example, Example 19 that besides the necessity of utilizing a complexing agent which passes through a stoichiometric complex greater than 1:1 upon dissociation, it is also necessary to precipitate the complex from solution (or slurry in the presence of an activating material). It is theorized that two cuprous atoms are linked to a single molecule of acetonitrile in a stable state and probably only one of the same two copper atoms is linked to an additional molecule of acetonitrile in a looser state. The looser state bonding does not produce the large pore structure (i.e., similar to monoolefins bonding of Example 1A) but it does not interfere with the formation of said structure (as shown in this example). Thus, as an over-simplified explanation of this, in all cases where the desired structure was obtained, more than one, e.g. two $\pi$ bonds of a single molecule of the complexing material are attached to more than one, e.g. two copper atoms which multiple bonding upon decomplexing produce the large pores. By comparison where only a single $\pi$ bond of the molecule is bound to one carbon atom the large pores are not obtained upon decomplexing. It is noted that by multiple bond we refer either to both double bonds of a diolefin or the two $\pi$ bonds of acetylenes or nitriles or carbon monoxide.

EXAMPLE 10.—HCl SOLUTION OF CuCl-ACRYLONITRILE COMPLEX ADDED TO WATER

The same general procedure as in Example 9 was used except that acrylonitrile was used instead of acetonitrile. The complex obtained contained 21.1 wt. percent acrylonitrile, i.e. 2 moles CuCl to 1 mol of acrylonitrile and upon dissociation was found to have a reasonably large pore, porous structure and high activity and capacity in fluid bed tests.

EXAMPLE 11.—HCl SOLUTION OF CuCl-CARBON MONOXIDE COMPLEX ADDED TO WATER 1500 cc. of room temperature saturated solution of B&A C.P. CuCl was prepared. This solution was purged with nitrogen to remove any air and then 6000 cc. of water at 0–5° C. was added dropwise over a 2–2.5 hour period while purging with carbon monoxide. No visible precipitate was formed until about 2 liters of water had been added (cloudiness appeared). The final precipitate was recovered by filtration and had a silvery, flaky appearance. The precipitate was washed twice with isopropyl alcohol and then twice with ethyl ether (in a CO atmosphere) and the ether was finally removed by fluffing with carbon monoxide. 260 grams of the complex were recovered. Microscopic examination revealed the typical (for good activity) transparent complexed particles which became opaque upon decomplexing. The particles were triangle shaped.

EXAMPLE 11A.—Water added to HCl SOLUTION OF CuCl-AMMONIA COMPLEX 125 cc. of room temperature saturated solution of B&A C.P. CuCl was prepared. The same procedure as in Example 11 was used except that gaseous anhydrous ammonia was used instead of CO and 350 cc. of water was added over a period of ½ hour. A light tan precipitate began to form after 100 cc. of water was added and continued growing throughout the further addition of water. The particles were washed with alcohol and dried with ether and fluffing was with gaseous $NH_3$. The material was heated to 100° C. in a vacuum furnace to dissociate the complex. A very low large pore porous structure was found.

EXAMPLE 12.—WATER ADDED TO HCl SOLUTION OF CuCl-METHYL ACETYLENE COMPLEX 1500 cc. of room temperature saturated solution of CuCl was prepared. The same procedure as in Example 11 was used except that gaseous methyl acetylene was used instead of carbon monoxide and that 6000 cc. of water was added dropwise over a period of 2 hours. A white precipitate began to form after addition of water. Fluffing was with methyl acetylene. The dissociated material had good large pore porous structure.

EXAMPLE 13.—SLURRY OF C.P. BUTADIENE (10 VOL. PERCENT METHANOL) WITH B&A SEGREGATED CUPROUS CHLORIDE 500 g. of Baker and Adamson segregated cuprous chloride (analyzed 100.4% CuCl by cuprous analysis) were added to 848 cc. of liquid C.P. butadiene at −25° C. 100 cc. of methanol was then added and the slurry was stirred for two hours. Finally the butadiene and alcohol were boiled off at about 0° C. and the CuCl complex was washed with alcohol, followed by ether and dried in a stream of flowing butadiene. Upon dissociation the particles were found to have the desired large pore, porous structure and high activity and capacity in fluid bed tests.

EXAMPLE 13A.—SLURRY OF C.P. LIQUID PROPYLENE WITH CUPROUS CHLORIDE RECRYSTALLIZED FROM HCl

A sample of the cuprous chloride recrystallized from concentrated HCl (added to water) was covered with liquid propylene (condensed in the reaction flask at −60° C.). The propylene-cuprous chloride slurry was stirred for about one hour and finally the propylene was boiled off by warming the complex to room temperature. A dry powdery product was obtained which had very low large pore porosity and poor activity and capacity. This indicates again that monoolefins cannot be used as the complexing agent to prepare the desired material.

EXAMPLE 13B.—SLURRY OF BAKER'S C.P. CuCl WITH CONCENTRATED HCl CONTINUOUSLY PURGED WITH BUTADIENE 500 grams of Baker's C.P. CuCl (large excess) was stirred with 600 ml. of concentrated HCl in the presence of 25 grams of metallic copper under a nitrogen blanket for two hours at room temperature. Butadiene was then substituted for $N_2$ and purged below the surface of the liquid for four hours. A liquid polymer layer collected when the stirring was stopped. The slurry was allowed to stand overnight under a butadiene atmosphere and the solids were then recovered by filtration and washed with alcohol followed by ether and finally dried in a flowing butadiene stream. The dry powdery product had a very low large pore porosity indicating that concentrated HCl is not a particularly effective activating agent for preparing the butadiene complex by the slurry technique.

EXAMPLE 14.—SLURRY OF C.P. BUTADIENE (40 VOL. PERCENT METHANOL) WITH B&A SEGREGATED CuCl 300 g. of Baker and Adamson segregated cuprous chloride were added to 400 cc. of methanol and the slurry was cooled to −10° C. Gaseous butadiene (7.4 ft.³) was then charged for 3 hours with stirring and the butadiene condensed in the reactor. The CuCl-butadiene complex after standing overnight was filtered off, washed with alcohol and then with ether and was dried in a stream of flowing butadiene. Upon dissociation the particles were found to have higher large pore porosity than where a smaller amount of alcohol was used. (cf. Example 11).

EXAMPLE 15.—SLURRY OF C.P. BUTADIENE (73 VOL. PERCENT METHANOL) WITH BAKER'S C.P. CUPROUS CHLORIDE 250 g. of Baker's C.P. cuprous chloride were added to 350 cc. of methanol and the slurry was cooled to −25° C. Gaseous butadiene was then charged for 30 minutes and the butadiene condensed in the reactor. A total of 146 g. of butadiene was added and the flask was stirred an additional 30 minutes after all the butadiene was in. The complex was filtered off and washed with alcohol then with ether and dried in a stream of flowing butadiene.

EXAMPLE 16.—SLURRY OF C.P. BUTADIENE PLUS METHANOL WITH HCl RECRYSTALLIZED CUPROUS CHLORIDE

This preparation was made in a fluid bed reactor at −25° C. by treating 130 g. of concentrated HCl recrystallized (added to water) cuprous chloride with enough C.P. butadiene to completely cover the collapsed bed. Then 30 cc. of methanol were added. A nitrogen stream was then fed to the bottom of the slurry to stir it for about one hour. After one hour the bed was heated to drive off the butadiene and methanol and a flowing stream of nitrogen was used to fluidize and dry the bed. Upon dissociation the particles were found to have the desired high activity and capacity in fluid bed tests.

EXAMPLE 17.—SLURRY OF CRUDE BUTADIENE WITH HCl RECRYSTALLIZED CuCl 200 g. of cuprous chloride recrystallized from concentrated HCl (added to water) were added to 180 gms. of liquid crude butadiene from steam cracking (30.7 wt. percent butadiene, 52 wt. percent isobutylene plus butene-1, the remainder being mainly paraffins but also containing other butenes and acetylenes) at −60° C. and the slurry was stirred for one hour. The crude butadiene was allowed to evaporate off at the boiling point of the crude butadiene, i.e. about −6° C. The material was then decomplexed in the fluid bed with gaseous nitrogen and yielded an amount of butadiene equal to 74–84% of theoretical. The decomplexed CuCl was found to have excellent large pore porosity and good activity and capacity.

EXAMPLE 18.—SLURRY OF C.P. BUTADIENE PLUS WATER WITH B&A SEGREGATED CUPROUS CHLORIDE

One liter of water was cooled to 5° C. 400 g. of Baker and Adamson segregated cuprous chloride were then added and butadiene was bubbled into the flask under the surface of the water with continuous stirring for a period of two hours. The stirrer was then stopped and the flask was allowed to stand overnight after which the cuprous chloride complex was filtered off, washed with alcohol and dried with ether in the usual manner. Upon dissociation the particles were found to have the desired large pore, porous structure and high activity and capacity in fluid bed tests.

EXAMPLE 19.—SLURRY OF C.P. LIQUID BUTADIENE WITH CUPROUS CHLORIDE RECRYSTALLIZED FROM HCl

A sample of the cuprous chloride recrystallized from concentrated HCl (added to water) was covered with liquid C.P. butadiene (condensed in the reaction flask at −60° C.). The butadiene-cuprous chloride slurry was stirred for about one hour and finally the butadiene was boiled off by warming the complex to room temperature. A dry powdery product was obtained which had comparatively low large pore porosity and comparatively poor activity and capacity.

EXAMPLE 20.—COMPARISON OF THE PHYSICAL PROPERTIES AND FLUID BED PERFORMANCE OF THE CuCl AND CuBr PREPARED IN PRECEDING EXAMPLES

The present example presents a comparison of the physical properties and performance in fluid bed tests on crude butadiene from steam cracking of the CuCl or CuBr prepared in the preceding examples. The fluid bed tests were conducted in a 27.5 inch length vertical glass reactor tube 28 mm. in diameter contained in a glass heating cooling jacket. Approximately 80 to 140 (in various runs) gms. of the CuCl or CuBr to be tested was charged (usually as the complex to prevent any deactivation by water in the air) along with approximately 100 gms. of Scotchlite glass beads to the reactor tube at room temperature. The reactor was then heated to approximately 90° C. while fluidizing with nitrogen to dissociate the complex (fluidized bed depth was 12–20 inches). After no more butadiene was detected in the tail gas (measurement by gas chromatography) the supply of nitrogen was cut off and measurement was made of the amount of material present in the original complex (by condensing the total effluent gases from the fluid bed in a Dry Ice trap during the dissociation step).

The reactor tube was then cooled to 0° C. and crude butadiene from steam cracking (31 wt. percent butadiene, 52 wt. percent isobutylene plus butene-1, the remainder being mainly paraffinic but also containing other butenes and acetylenes) was charged for one hour (temperature of the bed was about 10° C. above the temperature of the cooling jacket during the first 15–30 minutes for the good materials tested). The activity of the CuCl or CuBr tested (butadiene present in the feed recovered) was determined by difference between the butadiene content of the feed and tail gases measured during the first 15 minutes of the run (additional analyses showed that this activity was essentially constant to capacity which was reached for the good materials in the first 15 to 30 minutes). Following absorption, i.e. charging of crude butadiene for one hour the bed was purged with 0.3 ft.$^3$ of nitrogen at 0° C. to remove unreacted materials and then the bed was heated to 80° C. to effect decomplexing (no extraneous fluidization gases used except near end of the period when nitrogen was again supplied to make sure desorption was complete). The butadiene decomplexed was recovered in a Dry Ice trap and measured to determine the percent of theoretical capacity reached (theoretical capacity is 1 mol of butadiene for 2 mols of CuCl or CuBr). It is noted that the above described absorption and desorption steps were repeated at least 3 times and that the activity (percent recovery) and capacity (percent of theoretical) results reported in the table presented below are for the third cycle (similar results were obtained for the 1st cycle where such measurements were made). The absorption gas residence times reported were calculated from the gas flow rates assuming that the gas volume in the fluid bed was equal to the difference between the volume of the fluidized bed and the volume of the slumped bed.

EXAMPLE 21.—COMPARISON OF THE PHYSICAL PROPERTIES OF FLUID BED PERFORMANCE OF THE CuCl AND CuBr PREPARED IN PRECEDING EXAMPLES

| | Orig. Compl., Percent of Theo.[1] | Gas Res. Time, Sec. | Fluid Bed Operation 3rd Cycle on Butad.[2] | | Particle Size, µ | Pore Volume, cc./g. | | | | Fluidization |
|---|---|---|---|---|---|---|---|---|---|---|
| | | | Cap., Percent | Rec., Percent | | CCl$_4$ Pr. <800 A. | Hg Porosimeter | | | |
| | | | | | | | 70–550 A. | 550–10,000 A. | >10,000 A. | |
| HCl soln. of Baker's C.P. (96.5%) CuCl-Butadiene complex added to water. Ex. 1. | 100 | 1.4 | 53 | 93 | 5/50 | 0.02 | | | | Good. |
| Uncomplexed CuCl Recrystallized from HCl (98.5–100.0%). Ex. 1B. | 0 | 1.7 | [3] 14 | 45 | 10/50 | [4] Nil | [4] 0.006 | [4] 0.009 | [4] 0.187 | Do. |
| Evap. Butene-1 soln. of B&A C.P. (98.6%) CuCl complexed with butene-1. Ex. 1C. | 100 | 1.2 | 10 | 8 | 2/15 | Nil | 0.005 | 0.003 | 0.141 | Very poor. |
| Water added to HCl soln. of Baker's C.P. (96.5%) CuCl-butadiene complex. Ex. 2. | 100 | 1.7 | 79 | 78 | 100–300 | .01 | 0.007 | 0.084 | 0.611 | Excellent. |
| Acetylene added to HCl soln. of reagent grade Cu$_2$O precipitates complex directly. Ex. 4. | 50 | | | | 35/200 | 0.05 | 0.008 | 0.018 | 0.038 | |
| HBr soln. of B&A C.P. CuBr-butadiene complex added to water. Ex. 5. | 85 | 1.3 | 56 | 19 | 30/80 | 0.04 | 0.009 | 0.117 | 0.083 | Good. |
| Na$_2$SO$_3$ water soln. added to butadiene purged water soln. of CuCl$_2$. Ex. 7. | 99 | .9 | 78 | 93 | 10/100 | 0.01 | 0.002 | 0.098 | 0.198 | Do. |
| SO$_2$ and butadiene gases added to water soln. of CuCl$_2$. Ex. 8. | 95 | .9 | 59 | 80 | 25/180 | Nil | 0.007 | 0.197 | 0.044 | Do. |
| H$_2$O added to HCl soln. of Baker's C.P. (96.5%) CuCl-acetonitrile complex. Ex. 9. | 100 | 0.9 | 60 | 83 | 20/100 | 0.01 | 0.004 | 0.059 | 0.061 | Do. |
| H$_2$O added to HCl soln. of Baker's C.P. (96.5%) CuCl-acrylonitrile complex. Ex. 10. | 100 | 0.8 | 52 | 22 | 200/600 | 0.02 | 0.005 | 0.069 | 0.135 | Very poor. |
| H$_2$O added to HCl soln. of B&A C.P. (98.6%) CuCl-carbon monoxide complex. Ex. 11. | 75 | 1.6 | 47 | 82 | 100/300 | [5] <0.01 | [5] 0.005 | [5] 0.125 | [5] 0.045 | Excellent. |
| H$_2$O added to HCl soln. of B&A C.P. (98.6%) CuCl-ammonia complex. Ex. 11A. | | | | | 10/80 | 0.01 | 0.004 | 0.008 | 0.051 | Good. |
| H$_2$O added to HCl soln. of B&A C.P. (98.6%) CuCl-methyl acetylene complex. Ex. 12. | 90 | 0.8 | 62 | 82 | 100/400 | <0.01 | 0.005 | 0.159 | 0.022 | Excellent. |
| Slurry of C.P. Butadiene (10 vol. percent methanol) with B&A segregated (100.4%) CuCl. Ex. 13. | 76 | 1.7 | 67 | 94 | 5/90 | Nil | 0.006 | 0.093 | 0.537 | Good. |
| Slurry of C.P. Liquid Propylene with CuCl Recrystallized from HCl (98.5–100.0%). Ex. 13A. | ? | 1–2 | 8 | 21 | 15/90 [4] 15/90 | Nil [4] Nil | 0.006 [4] 0.004 | 0.006 [4] 0.003 | 0.028 [4] 0.050 | Do. |
| Slurry of Baker's C.P. (96.5%) CuCl with conc. HCl continuously purged with C.P. butadiene. Ex. 13B. | 18–32 | | | | 20/100 | Nil | 0.003 | 0.020 | 0.100 | |
| Slurry of C.P. Butadiene (40 vol. percent methanol) with B&A segregated (100.4%) CuCl. Ex. 14. | 92 | | | | 5/50 | 0.001 | 0.005 | 0.190 | 0.257 | |
| Slurry of C.P. Butadiene (73 vol. percent methanol) with Baker's C.P. (96.5%) CuCl. Ex. 15. | 37 | | | | 20/90 | 0.01 | 0.002 | 0.060 | 0.201 | |
| Slurry of C.P. Butadiene (Plus methanol) with HCl Recrystallized CuCl (98.5–100.0%). Ex. 16. | 67 | 1.8 | 64 | 32 | 5/50 mostly 5 | 0.01 | | | | Very poor. |

See footnotes at end of table.

EXAMPLE 21—Continued

| | Orig. Compl., Percent of Theo.[1] | Gas Res. Time, Sec. | Fluid Bed Operation 3rd Cycle on Butad.[2] | | Particle Size, μ | Pore Volume, cc./g. | | | | Fluidization |
|---|---|---|---|---|---|---|---|---|---|---|
| | | | Cap., Percent | Rec., Percent | | CCl$_4$ Pr. <800 A. | Hg Porosimeter | | | |
| | | | | | | | 70–550 A. | 550–10,000 A. | >10,000 A. | |
| Slurry of Crude Liquid Butadiene with CuCl recrystallized from HCl (98.5–100.0%). Ex. 17. | 74–84 | 2.3 | 56 | 97 | 10/75 | 0.01 | 0.003 | 0.138 | 0.294 | Good. |
| Slurry of C.P. Butadiene plus water with B&A segregated (100.4%) CuCl. Ex. 18. | 72 | 2.8 | 45 | 64 | 10/30 | 0.01 | 0.003 | 0.109 | 0.271 | Poor. |
| Slurry of C.P. liquid butadiene with CuCl recrystallized from HCl (98.5–100.0%). Ex. 19. | 76 | 3.2 | 26 | 97 | | Nil | 0.003 | 0.020 | 0.100 | Fair. |

[1] Theoretical complex is 2 mols Cu:1 mol complexing material except olefins and CO 1:1.
[2] The activity of the CuCl remains essentially constant throughout the solid residence time until the capacity is reached and then drops to zero.
[3] Even after repeated complexing-decomplexing cycles, the capacity never exceeded 18%.
[4] Measured after multiple use in fluid bed.
[5] Pore volumes from similar sample prepared using Baker's C.P. CuCl This example shows:

(1) that repeated cycles use of 98.5–100.0% purity CuCl on crude butadiene (Ex. 1B) does not produce the high activity (recovery percent) and high capacity obtained with the present new CuCl nor the high large pore porosity (550/10,000 A.) responsible for such activity and capacity.

(2) that use of monoolefins or ammonia as the complexing material (Ex. 1C and Ex. 13A) also does not produce the said high activity and capacity and high large pore porosity. Also, ammonia as the complexing material does not produce the high large pore porosity needed for high activity and capacity.

(3) that in the slurry preparations even with essentially pure (98.5–100.0%) CuCl, high capacity activity and accompanying high large pore porosity are not obtained with the liquid diolefin e.g. butadiene alone (Ex. 19), i.e. in the absence of a monoolefin solvent, alcohol, glycol, or water activating material.

(4) that in the slurry preparations 99+% purity CuCl (as compared to low purities) produces higher activity, capacity, and large pore volume even with alcohol (methanol) which provides the best activation of the activating materials (Ex. 14 vs. Ex. 15).

(5) that in the slurry preparations water is not as good an activating material as either monoolefins (mixed butenes in crude butadiene) or as alcohols (methanol) but that it does produce a very good material on all counts as compared to the poor materials described above. (Ex. 18, Ex. 17, Ex. 14.)

(6) that average particle size above about 10μ is necessary for good fluidization even with fluidization aid glass beads added and that poor fluidization besides causing high losses of particles, etc. also badly affects recovery percent due to bypassing of vapors even where the <10μ particles have good 550/10.000 A. porosity.

It is noted that with respect to the CuCl purities given above that special analytical procedures involving blanketing with CO$_2$ at all stages to prevent oxidation of CuCl to CuCl$_2$ were required to obtain the precision analyses necessary to define the present invention. For example B&A C.P. cuprous chloride was found to be 98.6% CuCl vs. greater than 95% CuCl reported by the company presumably using A.C.S. standard procedure for analyzing reagent grade CuCl (CO$_2$ blanketing not prescribed).

It is noted that in all the above preparations large pore 550/10,000 A. pore volume correlated closely with the activity (Recovery percent) and capacity measured in fluid bed tests. The capacity figure should first be noted and then the activity figure with due allowance being given for poor fluidization due to small particle size reducing the activity shown. It is further noted that although higher large pore (550/10,000 A.) porosities than about 0.039 cc./gm. i.e. about 10% are preferred, that a great improvement is obtained even with 10% large pore porosity. It is also noted that much of the above data is on smaller particles than the optimum large spherical macroparticles and that it would be expected that the high large porosities preparations would be particularly advantageous since some of the porosity would be lost in the joining of microparticles. Additional experiments were conducted to determine the effect with low purity CuCl (Mallinckrodt analytical reagent grade—analysis by present inventor 87.5% CuCl) in the precipitation of the complex from concentration HCl. It was found that the growth of the complex crystals effected essentially complete purification. The cuprous chloride removed from the complex upon dissociation was found to be greater than 99.5% and had a 550/10,000 A. pore volume of .106 cc./gms. It was further found that additions of copper pellets to the acid solution before the complexing reaction to reduce cupric copper as done in most of the preparations was not essential i.e. purity and 550/10,000 A. pore/volume after dissociation of this complex were 99.5% CuCl and .096 cc./gms.

EXAMPLE 22.—EFFECT OR RATE OF PRECIPITATION UPON SIZE OF ACTIVE PARTICLE

Presented below is a comparison of the effect upon particle size of the rate of precipitation or growth of the particle from solution. It is noted that all the preferred techniques for obtaining the said slow rate of crystal growth which produce the desired relatively large particles (fully discussed in this specification prior to the examples and used in the example preparations) all are encompassed within this single variable, i.e. precipitation rate. The precipitation rate is expressed in gms./hour/liter of solution containing the dissolved copper salt. This rate therefore takes into account the following variables which increase particle size: low concentration of dissolved copper salt, slow rate of addition of precipitating material, slow rate of increase in supersaturation (i.e. either addition of antisolvent, e.g. water, to the copper salt solution rather than vice versa, or alternatively addition of the copper salt solution to a limited amount of the antisolvent so that although initial precipitation as very fine crystals occurs (slight cloudiness) these are partially redissolved as the amount of solvent in the total mixture of solvent and antisolvent slowly increases and slow growth occurs (large particle precipitate) due to the simultaneously slow increase in the amount of CuCl or CuBr complex in the total mixture. The rates presented below were calculated in general as follows: the grams of complex recovered was divided by the time (hours) over which precipitation occurred and this figure was divided by the total liters of original cuprous salt solution. (Except when adding the acid to water, the time was assumed to be 3 seconds because the material precipitated as fast (e.g. 3 seconds) as the acid solution was added, due to the essentially complete insolubility of the complex.)

| Preparation | Precipitation Rates, gm./hr./liter | Particle Size, μ |
|---|---|---|
| Butadiene Complexes: | | |
| HCl Soln. of CuCl-Butadiene Complex Added to water. Ex. 1 | ~300 | 5/50 |
| Water Added to HCl Solution of CuCl-Butadiene Complex. Ex. 2 | 77 | 100/300 |
| $Na_2SO_3$ Water Solution Added to Butadiene Purged Water Solution of CuCl. Ex. 7 | <100 | 10/100 |
| $SO_2$ and Butadiene Gases Added to Water Solution of $CuCl_2$. Ex. 8 | 50 | 25/180 |
| No Complex—HCl Solution of CuCl (uncomplexed) Mixed with water in Pipe | 8,000 | 1-5 |
| Other Ligands—(Water added to HCl solution of Baker's C.P. (96.5%) CuCl—Ligand Complex): | | |
| Acetylene Ligand | 680 | 50/150 |
| Methylacetylene Ligand | 760 | 40/150 |
| Piperylene Ligand (added as gas diluted with $N_2$ | 760 | 20/100 |
| Allene Ligand | 1,000 | 50/150 |
| Carbon Monoxide Ligand | 680 | 50/300 |

EXAMPLE 23.—FLUID BED RECOVERY OF ETHYLENE USING VARIOUS CuCl PREPARATIONS

| Preparation Technique | Fluid Bed Results with 50:50 Ethylene/Ethane [a] | | |
|---|---|---|---|
| | Capacity, Percent of Theor. | $C_2=$ Recovery, Percent [b] | Fluidization |
| B&A C.P. (98.6%) CuCl | 0 | 0 | Poor. |
| Addition of HCl soln. of CuCl to Water purged with $C_4^=$ | 24 | 54 | Good. |
| Slurried B&A Special CuCl with $CH_3OH$ purged with gaseous $C_4^=$ for 3 hours. | 24 | 69 | Fair. |
| Slurried B&A Special CuCl with soln. of 9 wt. percent $CH_3OH$ in $C_4^=$. | 24 | 67 | Do. |

[a] Operating temp. of fluid bed was −35° C. at 1 atmosphere. Run length was normally 1 to 1.5 hrs. on feed which was much longer than needed to saturate the bed. Then the bed was purged with about 10 liters of $N_2$ at −35° C. and finally heated to 80° C. to recover the $C_2=$.
[b] Initial ethylene recovery is reported since the recovery decreases steadily throughout the active life of the bed in a given run.

EXAMPLE 26.—ADDITIONAL COMPLEXING AGENTS FALLING WITHIN THE CLASS OF THOSE PRODUCING ACTIVE CuCl OR CuBr

The following solid complexes in addition to those described above and in the literature which produce stable complexes having a ratio of copper to complexing agent above 1:1 were prepared in the laboratory (all 2:1 or above): With CuCl: ethyl acetylene, vinyl acetylene, 1,5 hexadiene, HCN, cyclopentadiene, cyclooctadienes (1,3; 1,4; and 1,5 all prepared) cyclododecatriene; with CuBr: acetylene, methyl acetylene, allene, piperylene. These complexes were prepared by absorption of the complexing material on solid CuCl or CuBr and thus did not produce the active porous material. However, this example indicates that these complexing agents can be used to prepare the active CuCl or CuBr by use of the techniques of the present invention.

EXAMPLE 27.—BUTADIENE RECOVERY IN A PRESSURIZED FLUID BED

Crude butadiene from steam cracking was supplied to a 2″ I.D. 15 ft. in length glass reactor containing a 2-pass bundle of ½″ diameter cooling-heating tubes extending 10 ft. vertically through the fluid bed. The temperature in the fluid bed was measured by thermocouples and the amount of CuCl (prepared by precipitation of the butadiene-CuCl complex in water, average particle size 10–60μ) was varied to determine percent butadiene recovery with different contacting times. The following results were obtained.

EXAMPLE 24.—ADDITIONAL SYSTEMS SEPARATED ON FLUID CuCl[1] BEDS

| System (percent's by wt.) | Complexing Temp., °C. | Complexing Pressure, atmos. | Product Recovered in High Purity [2] |
|---|---|---|---|
| 50 Ethylene-50 Ethane | −35 | 1 | Ethylene. |
| 50 Allene-50 Methylacetylene | 17 | 1 | Allene. |
| 10 Acetonitrile-90 Acrylonitrile | 23 | 1 | Acrylonitrile. |
| 90 Piperylenes-10 Cyclopentene | 17-30 | 1 | Piperylenes. |
| 92 Allene-8 Chloropropene | −10-−20 | 1 | Allene. |
| 33 Butadiene-67 Mixed Butenes | 0-33 | 1-4 | Butadiene. |
| 70 Transpiperylene-30 cis Piperylene | 30 | 1 | trans Piperylene. |
| 66 cis Piperylene-34 Cyclopentene | 21 | 1 | cis Piperylene. |
| 5 Butadiene-95 Isobutylene | 1 | 1 | Butadiene. |

[1] CuCl prepared by precipitation of HCl soln. of CuCl-Butadiene Complex. (Ex. 1.)
[2] 99+% pure.

EXAMPLE 25.—ADDITIONAL SYSTEMS SEPARATED IN FIXED CuCl[1] BEDS

| System (percent's by wt.) | Complexing Temp., °C. | Complexing Pressure, atmos. | Product Recovered in High Purity [2] |
|---|---|---|---|
| 50 Ethylene-50 Ethane | 0-25 | 16-20 | Ethylene. |
| 43 Ethylene-48 Ethane-9 Propylene | −18 | 20 | Do. |
| 65 cis Piperylene-35 Cyclopentene | 22 | 1 | cis Piperylene. |
| 96.5 trans Piperylene-3.5 Cyclopentene | 22 | 1 | trans Piperylene. |
| 45 CO-55 Ethylene | 0 | 20 | CO. |
| 45 Butadiene-55 Mixed Butenes | 0 | 2.5 | Butadiene. |
| 50 CO-50 $H_2$ | 0 | 20 | CO. |
| 93 Allene-7 Chloropropene | 0 | 1 | 99.9 Allene. |
| 98.3 Methylacetylene-Impurities | 0 | 1 | 99.9 Methylacetylene |

[1] CuCl prepared by precipitation of HCl soln. of CuCl-Butadiene Complex. (Ex. 1.)
[2] 99+% pure.

| Cycle Number | Total Pressure, p.s.i.g. | Aver. Temp. of Complex, °F. | Height of Fluid Salt Bed, Ft. | Super. Velocity, f.p.s. | Tail Gas, Mol Percent $C_4H_6$ | Percent Butadiene Recovery |
|---|---|---|---|---|---|---|
| 4.01 | 40 | ca. 115 | 2.5 | 0.30 | 22.3 | 41.7 |
| 4.02 | 40 | ca. 115 | 2.5 | 0.30 | 24.2 | 35.2 |
| 4.04 | 40 | 113 | 6.0 | 0.30 | 14.9 | 64.5 |
| 4.05 | 40 | 112 | 5.7 | 0.30 | 15.3 | 63.3 |
| 4.06 | 40 | 114 | 5.0 | 0.30 | 18.3 | 54.5 |
| 4.07 | 40 | 117 | 4.5 | 0.30 | 19.3 | 51.4 |
| 4.08 | 40 | 110 | 9.0 | 0.30 | 4.7 | 90.0 |
| 5.05 | 40 | 105 | 9.1 | 0.30 | 6.2 | 86.6 |
| 5.06 | 40 | 108 | 9.5 | 0.30 | 6.3 | 86.4 |
| 5.07 | 40 | 112 | 9.6 | 0.30 | 9.3 | 79.2 |
| 5.10 | 40 | 112 | 10.0 | 0.30 | 6.6 | 85.7 |

EXAMPLE 28.—ADDITIONAL COMPLEXING AGENTS PRODUCING ACTIVE POROUS CuCl AND THEIR EFFECT ON CRYSTALLIZATION TECHNIQUES

Preparation: 125 ml. of a water white saturated solution of Baker's C.P. CuCl in concentrated HCl at 23° C. was filtered and then saturated with the ligand being tested and then 375 ml. of $N_2$ purged distilled water was added while continuing the addition of ligand. The crystals were then filtered off, washed with isopropanol and ether, and finally dried under a flowing stream of the ligand.

| Ligand | Ligand in Complex, Weight Percent of CuCl | Ligand in Complex, Percent of Theor. | Pore Volume After Dissociation of Compd. | | | | Particle Size, Microns | Precipitation Rate, g./l./hr. |
|---|---|---|---|---|---|---|---|---|
| | | | $CCl_4$ 0-800 A. | 70-550 A. | Mercury 550-10,000 A. | >10,000 A. | | |
| Acetylene | 6.8 | 52 | >0.01 | 0.043 | 0.024 | 0.002 | 50/150 | 680 |
| Methylacetylene | 17.9 | 90 | >0.01 | 0.005 | 0.159 | 0.022 | 50/150 | 760 |
| Gaseous Piperylene [a] in $N_2$ | 32.9 | 97 | 0.01 | 0.006 | 0.098 | 0.367 | 20/100 | 760 |
| Allene | 20.0 | 100 | >0.01 | 0.009 | 0.168 | 0.009 | 50/150 | 1,000 |
| Carbon Monoxide | 20.0 | 72 | >0.01 | 0.005 | 0.125 | 0.045 | 50/300 | 680 |
| Ammonia | 0.7 | [b] 2 | 0.01 | 0.004 | 0.008 | 0.051 | 20/100 | 600 |

[a] 85% trans-15% cis piperylene mixture.
[b] Based on $2NH_3$ per CuCl.

This example indicates that acetylenes, conjugated and nonconjugated diolefins, and carbon monoxide are excellent complexing agents to produce the desired high activity, high large pore porosity cuprous chloride and cuprous bromide complexing agents. It also indicates that ammonia is not a suitable complexing agent and further indicates that $C_3+$ acetylenes are much better complexing agents than acetylene. Thus acetylene is known to behave in a considerably different way in chemical reactions, e.g., higher activity as compared to the higher acetylenes.

This example also indicates that higher allowable precipitation rates to obtain large particle size and efficient fluidization may be used with these complexing agents as compared to butadiene because the cuprous chloride or cuprous bromide complex with these materials is more soluble in the dilute acid than are the butadiene complexes.

EXAMPLE 29.—COMPLEXING NEAR THE DEW POINT WITH ACTIVE CuCl

A study was made of the effect of operating near the dew point with active CuCl (obtained by precipitation of the butadiene complex from concentrated HCl) upon the activity and capacity obtained in fluidized solids operations on crude butadiene from steam cracking, and C.P. butadiene diluted with $N_2$, butane, butene-1 and isobutylene respectively. (Complexing temperature 32° F., 1 atm. total pressure.) The following results were obtained:

| Cycle No. | Diluent | Complexing Time, Min. | Butadiene Partial Pressure, Atm. | °F. From Dew Point | Capacity, Percent |
|---|---|---|---|---|---|
| 13 | Nitrogen | 12 | 0.30 | 57 | 20 |
| 6 | Butane | 12 | 0.37 | 5 | 35 |
| 8 | Butene-1 | 8 | 0.37 | 10 | 45 |
| 23 | Isobutylene | 12 | 0.31 | 12 | 52 |
| 3 | Refinery Stream | 13 | 0.35 | [1] 12 | 47 |

[1] Approximate.

The above data indicate the importance of operating within 25° F., preferably within 12° F., of the dew point both with and without monoolefin solvent activators; i.e., the latter additionally improve capacity as can be seen from the butane run.

Similar data were obtained on C.P. butadiene, complexing time 1 hour (heat being given off, indicated complexing substantially complete by this time) at various temperatures.

| Cycle Number | Complexing Temperature (°F.) | °F. from Dew Point | Capacity |
|---|---|---|---|
| 1-4 | 32 | 7 | 60.5 |
| 5-7 | 50 | 25 | 35.4 |
| 8-9 | 86 | 61 | 35.0 |
| 10 | 32 | 7 | 57.0 |

This data indicates the same results are obtained by varying temperature as by varying partial pressures. It also indicates that capacity can be restored by returning the conditions near the dew point. It is noted that activity appeared to be proportional to capacity in all the cycles reported in this example.

EXAMPLE 30.—LIQUID PHASE ETHYLENE RECOVERY 560 grams of commercial (Bower C.P.) cuprous chloride and 560 grams of the same commercial cuprous chloride activated by liquid phase complexing with a 35 wt. percent butadiene, 65 wt. percent $C_4$ monoolefin mixture and vapor phase dissociating were separately reacted in a stirred autoclave with a liquid mixture of approximately 2.5 mol percent ethylene dissolved in n-heptane, i.e., Raoult's law calculation from partial pressure ethylene in the exit gas (effect of heptane partial pressure in vapor phase is negligible). The data are:

| | Activated CuCl | Commercial CuCl |
|---|---|---|
| Feed Gas: | | |
| Ethylene, mol percent | 41.6 | 47.9 |
| Propylene, mol percent | 9.1 | |
| Nitrogen, mol percent | 49.3 | 52.1 |
| Feed Gas Rate, ft.³/hr | 12.25 | 12.25 |
| Slurry Concentration, wt. percent | 50 | 50 |
| Temperature, °F | -30 | -30 |
| Pressure, p.s.i.g | 200 | 200 |
| Equilibrium, partial pressure ethylene in exit gas, p.s.i.a | 5.8 | 6.2 |
| Complexing Time, Hr | 1 | 1 |
| Percent of Theoretical solids loading: | | |
| Ethylene | 52.5 | 30.0 |
| Ethylene plus propylene | 57.5 | |

In this specification and in the appended claims the terms "absorption" and "desorption" are used in their ordinary meanings in this art, viz. to designate respectively the chemical combination of cuprous chloride or bromide with a material to form an addition compound or complex with it, preferably a π complex, and the decomposition of said addition compound to regenerate said material. The term "Pi complex" is employed herein to mean a complex of the type referred to in "Mechanisms of Inorganic Reactions" by Basolo and Pearson, pp 183–185, published by John Wiley, 1958.

It is to be understood that this invention is not limited to the specific examples, which have been offered merely as illustrations, and that modifications may be made without departing from the spirit of this invention.

What is claimed is:

1. A process for the separation of a compound capable of forming a complex with a cuprous halide from a mixture containing it other than a mixture containing both a diolefin and appreciable quantities of a monoolefin, which comprises contacting said mixture, initially and throughout multiple cycles, with solid unsupported porous unitary particles of a cuprous halide selected from the group consisting of CuCl and CuBr in the absence of the presence of 1 wt. percent and above based on the said mixture of a material selected from the group consisting of alcohols and water, under conditions to form a complex between said compound and said cuprous halide complexing agent and subsequently dissociating said complex to recover said compound, the said particles having a porosity of above 10% (of the total volume of a particle) 550–10,000 A. pores.

2. The process of claim 1 in which the particles are above 50% 10–600μ particles.

3. The process of claim 1 in which the particles are above 50% spherical macroparticles composed of more than four 5–30μ (length) microparticles, and the porosity is above 20% 550–10,000 A. pores.

4. The process of claim 1 in which the particles are above 50% spherical macroparticles composed of less than four 5–30μ (length) microparticles, and the porosity is above 20% 550–10,000 A. pores.

5. The process of claim 1 in which the compound capable of forming a complex with the cuprous halide is ethylene.

6. The process of claim 1 in which the compound capable of forming a complex with the cuprous halide is carbon monoxide.

7. The process of claim 1 in which the cuprous halide is cuprous chloride having a porosity of above 30% 550–10,000 A. pores.

8. The process of claim 7 in which the cuprous chloride also has above 1% (of the total volume of the particle) of 70–550 A. pores.

9. The process of claim 1 in which the cuprous halide particles are continuously circulated in contact with cooling surfaces during formation of the complex.

10. A process for the separation of a compound capable of forming a complex with a cuprous halide from a mixture containing it which comprises contacting said mixture, initially and throughout multiple cycles, in the vapor phase with solid porous unitary particles of a cuprous halide complexing agent selected from the group consisting of cuprous chloride and cuprous bromide, the said particles having a porosity of above 10% (of the total volume of the particles) 550–10,000 A. pores and being above 50% 10–600μ particles, under conditions to form a complx between said compound and said complexing agent and subsequently dissociating said complex to recover said compound.

11. The process of claim 10 in which the cuprous halide is cuprous chloride having a porosity of above 30%, 550–10,000 A. pores.

12. The process of claim 10 in which contacting to form the complex is carried out at a temperature within 10° C. of the dewpoint of the mixture contacted.

13. The process of claim 10 in which the mixture contacted is a crude diolefin stream from refinery operations selected from the group consisting of $C_4$ streams, $C_5$ streams, $C_6$ streams and mixtures of these and complexing is carried out at a temperature within 10° C. of the dewpoint of the stream.

14. The process of claim 10 in which the compound capable of forming a complex with cuprous halide is ethylene.

15. The process of claim 10 in which the compound capable of forming a complex with cuprous halide is carbon monoxide.

16. The process of claim 10 in which the compound capable of forming a complex with cuprous halide is acrylonitrile and acetonitrile is also present in the mixture.

17. The process of claim 10 in which the said particles are continuously circulated in contact with cooling surfaces during formation of the complex.

18. The process of claim 10 in which the complexed cuprous halide is treated prior to desorption to substantially completely remove liquids wetting the particle surfaces including the pore surfaces under conditions to prevent any appreciable desorption occurring in said treatment.

19. In a continuous fluidized solids vapor phase process for the separation of a compound capable of forming a complex with a cuprous halide from a vaporous mixture containing it by contacting cuprous halide under conditions to form a complex between said compound and said cuprous halide and wherein said complex is subsequently dissociated to generate the complexed compound, carried out utilizing two fluid beds of the cuprous halide, one operated on complexing and one on dissociation and the cuprous halide complexing agent is circulated between the two fluid beds, the improvement which comprises using as the said cuprous halide complexing agent, initially and throughout multiple cycles, solid porous unitary particles of a cuprous halide complexing agent selected from the group consisting of cuprous chloride and cuprous bromide, the said particles having a porosity of above 15% (of the total volume of the particles) 550–10,000 A. pores and being above 50% 20–300μ particles.

20. The process of claim 19 in which contacting to form the complex is carried out at a temperature within 10° C. of the dewpoint of the mixture contacted.

21. The process of claim 20 in which the mixture contacted is a crude diolefin stream from refinery operations selected from the group consisting of $C_4$ streams, $C_5$ streams, $C_6$ streams and mixtures of these.

22. The process of claim 19 in which dissociated complexing agent is supplied to the top of a fluid bed of the complexing agent operated under complexing conditions and flows downwardly through the said bed countercurrent to upwardly flowing vapors of the vaporous mixture to be separated supplied at the bottom of the fluid bed, and in which complexed complexing agent is withdrawn from the bottom of the fluid bed and is stripped of nonselectively absorbed materials prior to being dissociated.

23. The process of claim 19 in which stripping is conducted by partially dissociating the complexed particles to thereby sweep nonselectively absorbed materials from the surfaces of the pores.

24. The process of claim 19 in which the stripping gas and the desorption gas are a portion of the overhead gas from the top of the second fluid bed operated under dissociation conditions.

25. The process of claim 19 in which complexed cuprous halide is cuprous chloride and the cuprous chloride is dissociated at temperatures below 110° C. to prevent annealing losses of the large pore porous structure.

26. A process for preparing an active, high large pore porosity, solid cuprous halide complexing agent selected from the group consisting of CuCl and CuBr which comprises slowing mixing an antisolvent with a liquid solution of the cuprous halide complexed with a complexing agent which forms a stable complex with the said cuprous halide having a ratio of copper to complexing agent greater than 1:1 to obtain a precipitate of uniform solid particles of the complexed cuprous halide of a particle size above about $10\mu$, and dissociating the complexed cuprous halide particles to obtain the active cuprous halide complexing agent.

27. The process of claim 26 in which the complexing agent is a material selected from the group consisting of a diolefin, an acetylene, a nitrile, and carbon monoxide.

28. The process of claim 26 in which the complexing agent is butadiene and in which the precipitation rate is less than 1000 gms./hour/liter.

29. The process of claim 26 in which the antisolvent is slowly added to the liquid containing the complexed cuprous halide in solution.

30. The process of claim 29 in which the antisolvent is water and the liquid containing the cuprous halide in solution is 2-12 N HCl.

31. A process for preparing an active, high large pore porosity, solid cuprous chloride complexing agent which comprises slowly adding a reducing agent and a complexing agent which forms a stable complex with cuprous chloride having a ratio of copper to complexing agent greater than 1:1 to cupric chloride dissolved in a liquid having low solubility for the complexed cuprous chloride, whereby solid particles of the complexed cuprous chloride of a particle size above $10\mu$ precipitate directly from the liquid, and dissociating the complexed cuprous chloride particles to obtain the active cuprous chloride complexing agent.

32. The process of claim 31 in which the complexing agent is a diolefin, the reducing agent is $SO_2$, and the liquid containing the cupric chloride dissolved therein is water.

33. A process for the separation of a compound capable of forming a complex with a cuprous halide from a mixture containing it which comprises contacting said mixture, initially and throughout multiple cycles, with solid porous unitary particles consisting essentially of a cuprous halide complexing agent selected from the group consisting of cuprous chloride and cuprous bromide having a porosity of above 10 percent (of the total volume of the particle) 550-10,000 A. pores, under conditions to form a complex between said compound and said complexing agent and subsequently dissociating said complex to recover said compound.

References Cited

UNITED STATES PATENTS

| | | | |
|---|---|---|---|
| 2,386,300 | 10/1945 | Drennan et al. | 260—681.5 |
| 2,386,379 | 10/1945 | Wolk | 260—681.5 |
| 2,386,734 | 10/1945 | Wolk | 260—681.5 |
| 2,395,355 | 3/1946 | Soday | 260—681.5 |

DELBERT E. GANTZ, *Primary Examiner.*

G. E. SCHMITKONS, *Assistant Examiner.*

U.S. Cl. X.R.

23—97